(12) United States Patent
Daigi

(10) Patent No.: US 7,116,842 B2
(45) Date of Patent: Oct. 3, 2006

(54) IMAGE PROCESSING METHOD AND IMAGE PROCESSING APPARATUS

(75) Inventor: Tomoaki Daigi, Kadoma (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 726 days.

(21) Appl. No.: 10/258,153

(22) PCT Filed: Apr. 20, 2001

(86) PCT No.: PCT/JP01/03397

§ 371 (c)(1),
(2), (4) Date: Oct. 18, 2002

(87) PCT Pub. No.: WO01/82286

PCT Pub. Date: Nov. 1, 2001

(65) Prior Publication Data

US 2003/0099410 A1    May 29, 2003

(30) Foreign Application Priority Data

Apr. 21, 2000    (JP)    .............................. 2000-121712
Aug. 24, 2000    (JP)    .............................. 2000-253744

(51) Int. Cl.
*G06K 9/32*    (2006.01)
*H04N 1/46*    (2006.01)

(52) U.S. Cl. ..................................... 382/300; 358/525

(58) Field of Classification Search ........ 382/298–300, 382/162, 278; 348/452; 375/240.02; 358/1.2, 358/2.1, 525, 528

See application file for complete search history.

(56) References Cited

U.S. PATENT DOCUMENTS

| 5,347,599 | A | * | 9/1994 | Yamashita et al. | 382/278 |
| 5,504,531 | A | * | 4/1996 | Knee et al. | 348/452 |
| 5,649,034 | A | * | 7/1997 | Sonobe | 382/298 |
| 5,754,710 | A | * | 5/1998 | Sekine et al. | 382/300 |
| 5,901,254 | A |   | 5/1999 | Iguchi et al. | |
| 6,496,608 | B1 | * | 12/2002 | Chui | 382/300 |
| 6,704,358 | B1 | * | 3/2004 | Li et al. | 375/240.02 |
| 6,704,463 | B1 | * | 3/2004 | Okada et al. | 382/300 |
| 6,707,937 | B1 | * | 3/2004 | Sobel et al. | 382/162 |
| 6,980,254 | B1 | * | 12/2005 | Nishihashi et al. | 348/452 |

FOREIGN PATENT DOCUMENTS

| JP | 06-309452 | 11/1994 |
| JP | 07-226837 | 8/1995 |

* cited by examiner

Primary Examiner—Kanjibhai Patel

(57) ABSTRACT

An image processing method and apparatus for converting an original image by performing a pixel number conversion on the original image at a predetermined pixel number conversion rate in at least one of a column direction and a row direction in a matrix that has been specified. A character judging step determines whether each of a plurality of areas making up the original image is a character part or not. When it is determined that image has a character part, a pixel number conversion procedure is performed so that the lines within the original image are converted into lines with the same line width in the converted image. Alternatively, areas that are judged a character part can use an alternative pixel number conversion procedure so that a barycenter in the original image is maintained after the pixel number conversion.

8 Claims, 25 Drawing Sheets

→ CHARACTER PART
BLACK : LINE PART
WHITE : BACKGROUND PART

→ NON-CHARACTER PART

INTERPOLATION TABLE FOR (XH=1.2, XV=1.4)

| | 1 | 2 | 3 | 4 | 5 |
|---|---|---|---|---|---|
| 1 | VERTICAL (1,1) (1,2) | TWO-WAY DIRECTION (2,1) (3,1) (2,2) (3,2) | VERTICAL (4,1) (4,2) | VERTICAL (5,1) (5,2) | VERTICAL (6,1) (6,2) |
| 2 | — | HORIZONTAL (2,3) (3,3) | — | — | — |
| 3 | VERTICAL (1,4) (1,5) | TWO-WAY DIRECTION (2,4) (3,4) (2,5) (3,5) | VERTICAL (4,4) (4,5) | VERTICAL (5,4) (5,5) | VERTICAL (6,4) (6,5) |
| 4 | — | HORIZONTAL (2,6) (3,6) | — | — | — |
| 5 | — | HORIZONTAL (2,7) (3,7) | — | — | — |

FIG. 16

FIG.18B HORIZONTAL DIRECTION(EXCEPTIONAL)
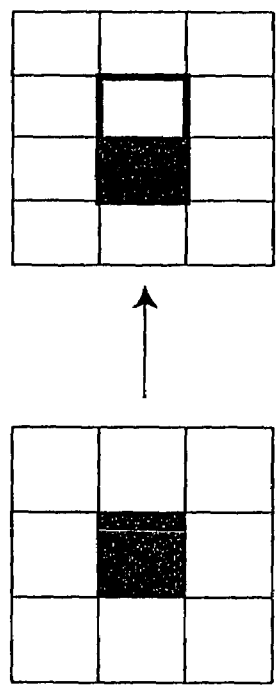
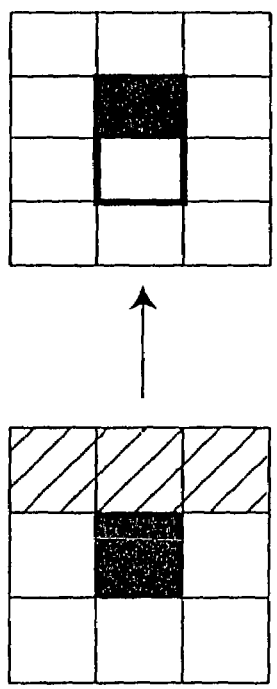
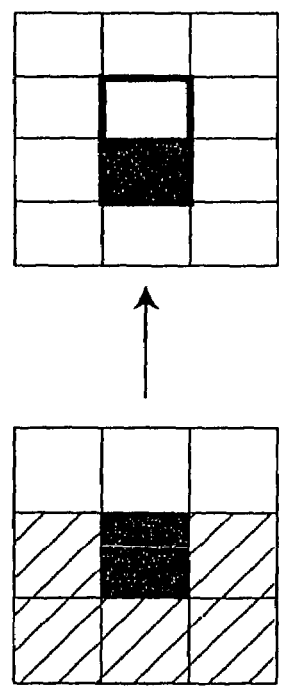
① ② ③
FIG.18A HORIZONTAL DIRECTION
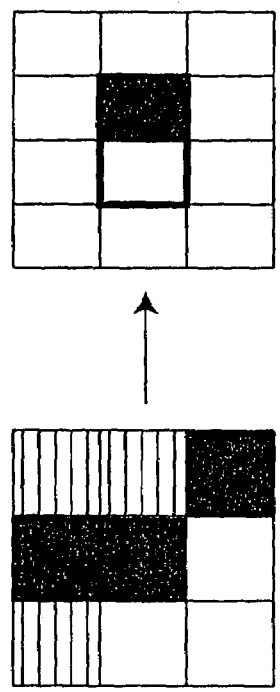
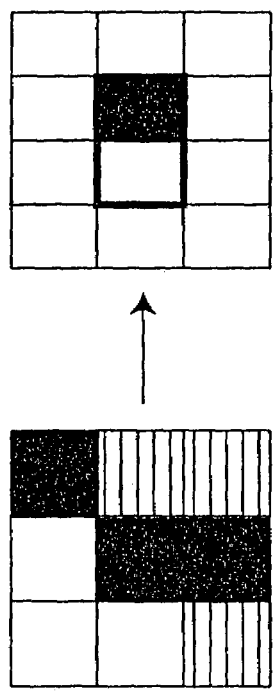
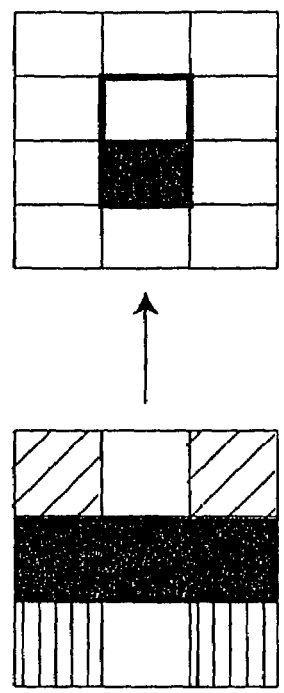
① ② ③

FIG.19B VERTICAL DIRECTION(EXCEPTIONAL)
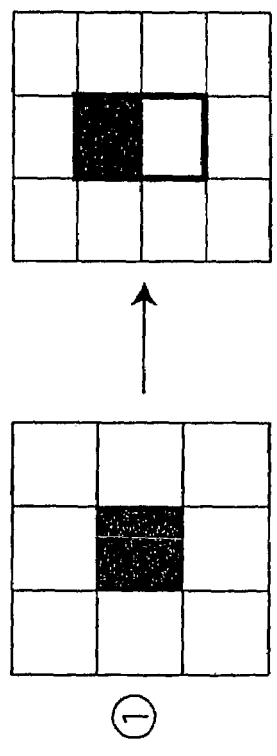
①
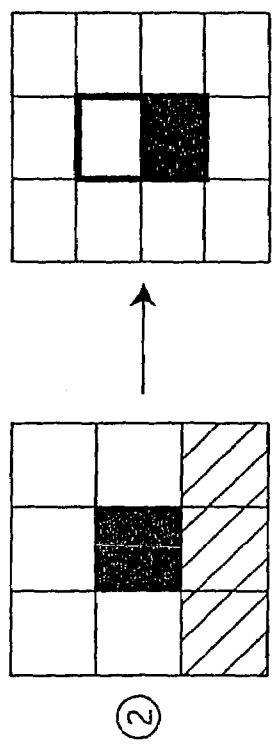
②
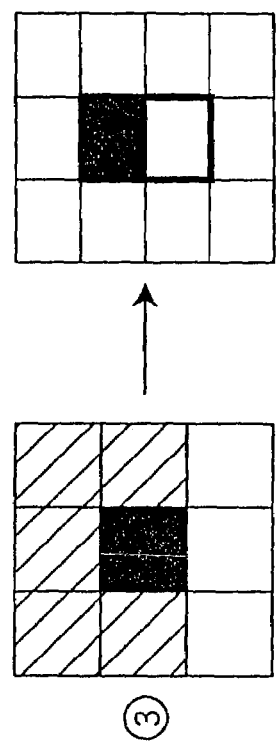
③
FIG.19A VERTICAL DIRECTION
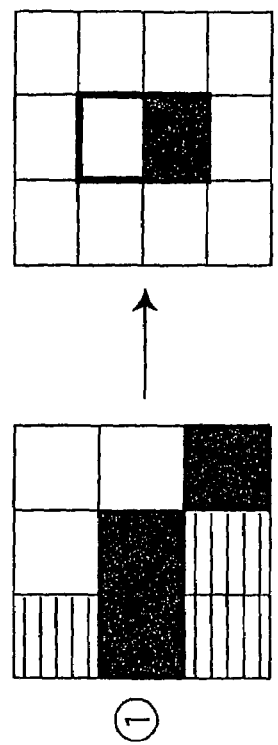
①
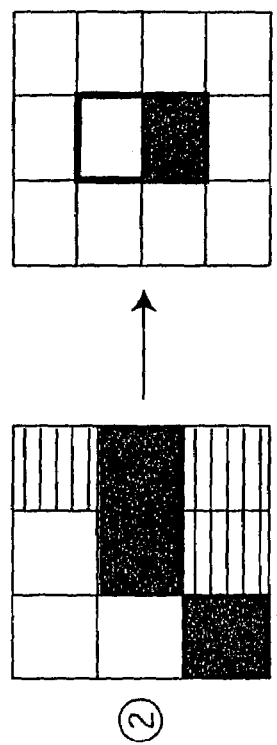
②
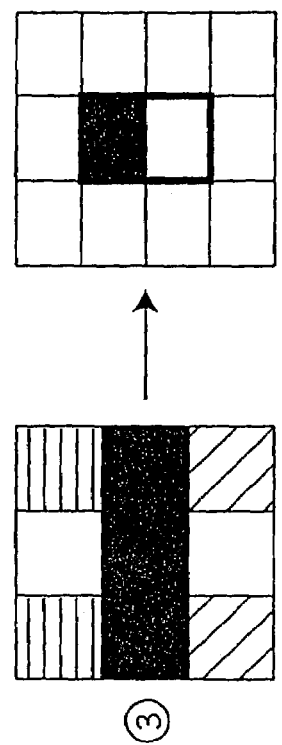
③

TWO-WAY DIRECTION

FIG.20B
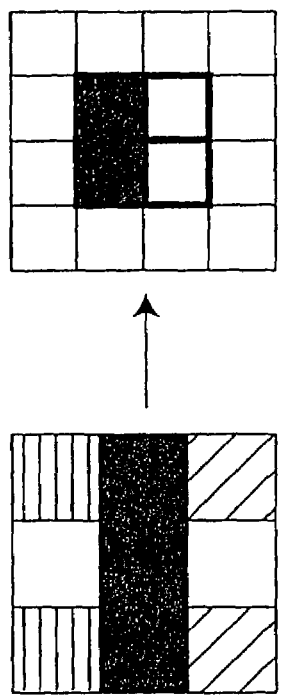
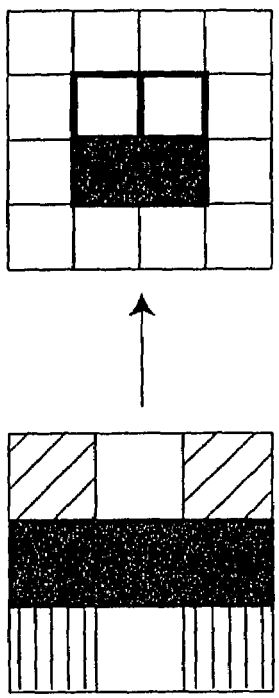
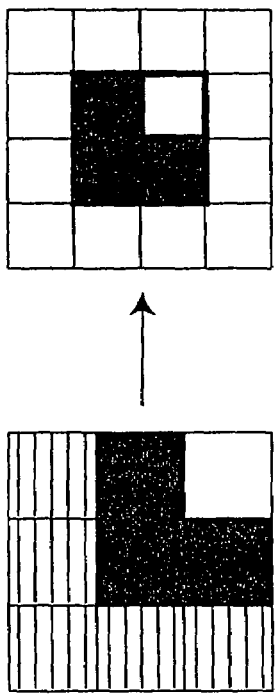
④ ⑤ ⑥
TWO-WAY DIRECTION(EXCEPTIONAL)
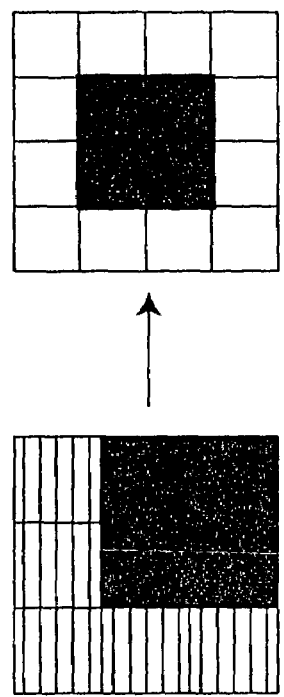
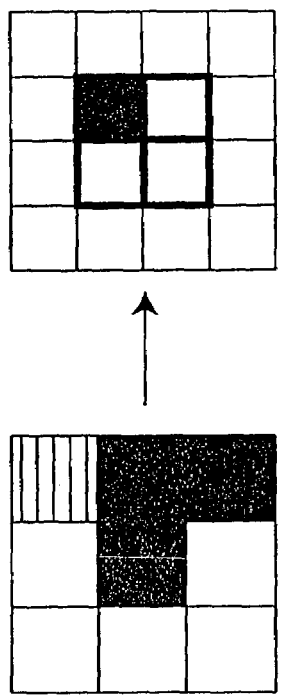
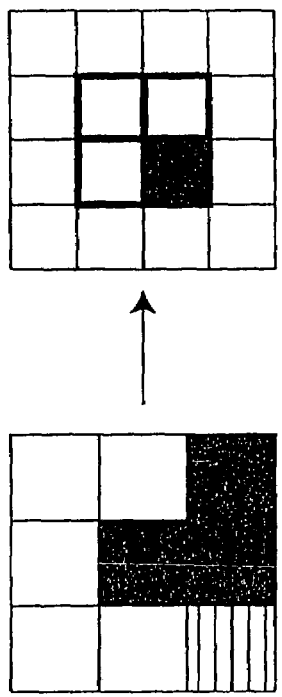
① ② ③

CUBIC INTERPOLATION
PRIOR ART

NEAREST NEIGHBORHOOD INTERPOLATION1
PRIOR ART

NEAREST NEIGHBORHOOD INTERPOLATION2
PRIOR ART

IMAGE PROCESSING METHOD AND IMAGE PROCESSING APPARATUS

FIELD OF INVENTION

The present invention relates to an image processing method and an image processing apparatus for inputting an original image so as to convert such into an image having different number of pixels.

BACKGROUND ART

When personal computers and television receivers display an image sent from a source, it is necessary to perform a pixel number conversion on the original image by using image processing apparatuses in a desired conversion rate.

Representative examples of the pixel number conversion method used for such type of image processing apparatus include cubic interpolation and linear interpolation, which perform interpolation using luminous values of pixels around the pixel to be converted. Also included in the representative examples is nearest neighborhood interpolation that uses a gradation value of the nearest pixel in the coordinates as it is.

Personal computers and television receivers need to display both of natural images and letter images. These days, there is intensified needs for each type of image to be easy to be seen on a screen after conversion.

Here, according to the cubic interpolation and the linear interpolation, the barycenter of the gradation value will be maintained after conversion. Therefore, these two interpolation methods are suitable for natural images since the converted images will look natural without image blurriness as a whole. However, these two interpolation methods are not ideal for letter images (i.e. images that have sharp edges such as letter or graphics) since the edge parts will be blurred.

On the other hand, nearest neighborhood interpolation is not ideal for natural images since the converted images will not look natural. But it is suitable to be used in conversion of letter images since the converted edge parts will not look blurry. However there is one problem, that is, line-widths as a whole will not be uniform. That is, for lines whose line-widths used to be the same will be converted into lines with different widths depending on the location of the lines.

In particular, many of original images treated by personal computers are letter or charts that are composed of fine lines having line-width of one pixel. These images will yield, if nearest neighborhood interpolation is applied, images that have lines of different line-width from each other, which seems strange to viewers.

There have been developed an image processing apparatus that can select between the mentioned cubic interpolation and the nearest neighborhood interpolation, for displaying both of the natural and letter images.

For example, Japanese Laid-open Patent Application No. H11-203467 discloses an image processing apparatus that consists of a waveform identifying circuit 31, a selector 32, a cubic interpolation processing circuit 33, and a nearest neighborhood interpolation processing circuit 34 (see FIG. 23).

In the stated apparatus, the waveform identifying circuit 31 identifies an input image signal 35, then, normally the selector 32 selects the cubic interpolation processing circuit 33. However, if the edge part is identified as a cascade waveform, the selector 32 selects the nearest neighborhood interpolation circuit 34. The apparatus enables to apply cubic interpolation to natural images, and to apply nearest neighborhood interpolation to the edge-part images. This method enables to obtain pixel image suitable for natural images, and to obtain images with reduced blurriness for edge-part images.

However, even with the above apparatus, the problem of the inconsistency in line-widths still exists.

The above problem is explained with reference to FIG. 24.

FIGS. 24A, 24B, and 24C depict three examples for performing interpolation in the horizontal direction. FIG. 24A and FIG. 24C use nearest neighborhood interpolation, and FIG. 24B uses cubic interpolation. This figure depicts the manner in which an input image consisting of pixel coordinates H1–H5 positioned in the horizontal direction is converted into pixel coordinates D1–D6 also in the horizontal direction.

In FIGS. 24A, 24B, and 24C, a white pixel represents high luminance (a luminous value of 255), a black pixel represents low luminance (a luminous value of 0), a double-hatched pixel represents a medium low luminance (a luminous value of 64), and a black-dot hatched pixel represents medium luminance (a luminous value of 128).

In FIG. 24A and FIG. 24B, H3 in the input image represents low luminance, and the other pixels H1, H2, H4, and H5 represent high luminance. In the stated examples, H3 is the line-forming pixel. On the other hand, in FIG. 24C, H4 in the input image is the line-forming pixel.

When performing cubic interpolation as in FIG. 24B, each of the pixels after conversion: D2, D3, D4, and D5 is interpolated using the four pixels before conversion as references. For example, the coordinates D3 in the output image are interpolated using the coordinates H1–H4 as a reference.

In this case, in the input image, a line has a width of one pixel (H3), whereas after conversion, the width is magnified to be four pixels (D2–D5), and becomes blurry due to the reduced luminous difference between D2–D5 and the pixels around D2–D5 (i.e. D1, D6).

In both FIGS. 24A and 24C, nearest neighborhood interpolation is performed. In FIG. 24A in which H3 is the line-forming pixel, D3 and D4 will be the line-forming pixels in the output image. On the other hand, in FIG. 24C in which H4 is the line-forming element, only D5 will be the line-forming pixel in the output image. As such, two lines of a same line-width are converted into lines of different widths with each other: in FIG. 24A, in two-pixel width; and in FIG. 24C, in one-pixel width.

DISCLOSURE OF INVENTION

The object of the present invention is to provide an image processing method and an image processing apparatus that can obtain high-quality images that do not look blurry and so seem less strange to viewers.

In order to achieve the above object, in the present invention, when performing a pixel number conversion on an inputted original image in at least one of a row direction and a column direction that has being specified, the inputted original image being for displaying in a matrix form, adjustment is made so that line-forming pixels after conversion corresponding to line-forming pixels included in inputted image signal continue for a predetermined number defined based on a pixel number conversion rate, by acquiring character information on a consecutive number of the line-forming pixels in the inputted original image.

The above mentioned line-forming pixel is a pixel that forms line segments in letter or ruled lines.

Here, adjustment should be made so that the position of the line-forming pixels after conversion is as near as that of the line-forming pixel in the input image.

As described as a conventional technique, if letters or ruled lines having a same line-width in the original image are converted into those having a different line-width, the letters or ruled lines after conversion will look strange to viewers. However, as in the present invention, adopting a pixel number conversion that prioritizes line-width of letters or ruled lines (in particular, a fine line having a line-width of 1 or 2 pixels) in the input image will yield converted images in which a uniform line-width is maintained. The converted image yielded by the present invention will look less strange to viewers, even if it is true that it is more likely that the position of the converted line segments might be changed compared with the position in the original image, with this method than the nearest neighboring interpolating method.

The reason why the converted image will look less strange to viewers by prioritizing the consistency between line-widths is that generally speaking for line segments such as in letters or ruled lines (in particular, fine lines having such line-width as 1 or 2 pixels), it will look less strange if the converted image have a uniform line-width; it tends to look more strange if the converted image has lines whose positions are misaligned.

Concrete examples for performing pixel number conversion while keeping a consistency in line-width as mentioned in the above are as follows.

- a method of 1) detecting line-forming pixels included in an inputted original image, and 2) adjusting so that line-forming pixels after conversion corresponding to the line-forming pixels in the inputted original image will continue in a specified direction, for a predetermined number defined based on a pixel number conversion rate.
- a method of 1) detecting an edge-forming pixel included in the input original image, and 2) adjusting so that edge-forming pixel after conversion will continue in a specified direction, for a number of an integer obtained by multiplying continuous line-forming pixels in the input image by a uniquely-defined integer obtained based on a pixel number conversion rate.
- a pixel number conversion method performed by combining 1) a first interpolation for outputting pixels after conversion in the neighborhood of the input pixel, and 2) a second interpolation for outputting pixels after conversion corresponding to inputted original pixel by performing a pattern matching on the inputted original pixel using a predetermined conversion table.

The present invention further enables to judge as to whether the input image has a character as a letter image, and if the input image has such character, line-width interpolation described in the above is adopted, and when the input image does not have such character, a barycenter interpolation method such as linear interpolation or cubic interpolation is selected in conversion.

The above arrangement enables to convert natural images so that the converted image looks natural, and to convert letter images so that the converted image has lines with a uniform line-width.

In addition, it is also possible to apply the line-width prioritize interpolation for a pixel number conversion rate having a value which is near an integer.

THE BRIEF DESCRIPTION OF THE DRAWINGS

Figure 7C:
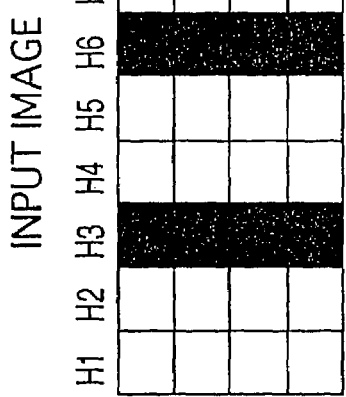
Figure 7B:
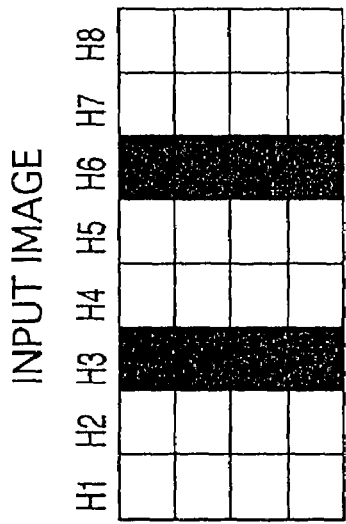
Figure 7A:
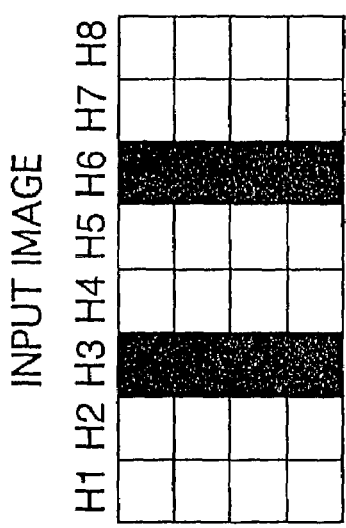
Figure 8:
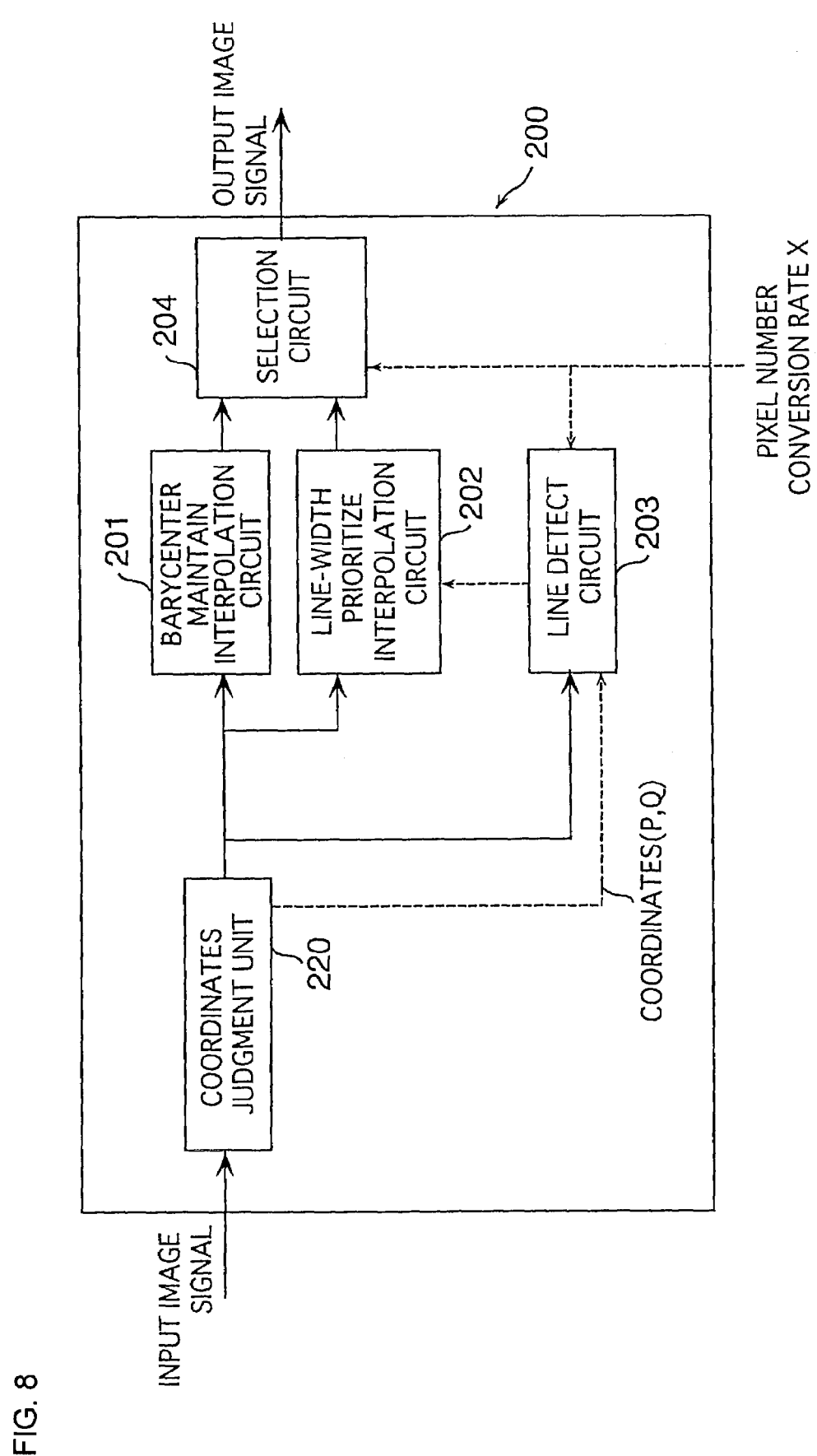
Figure 9:
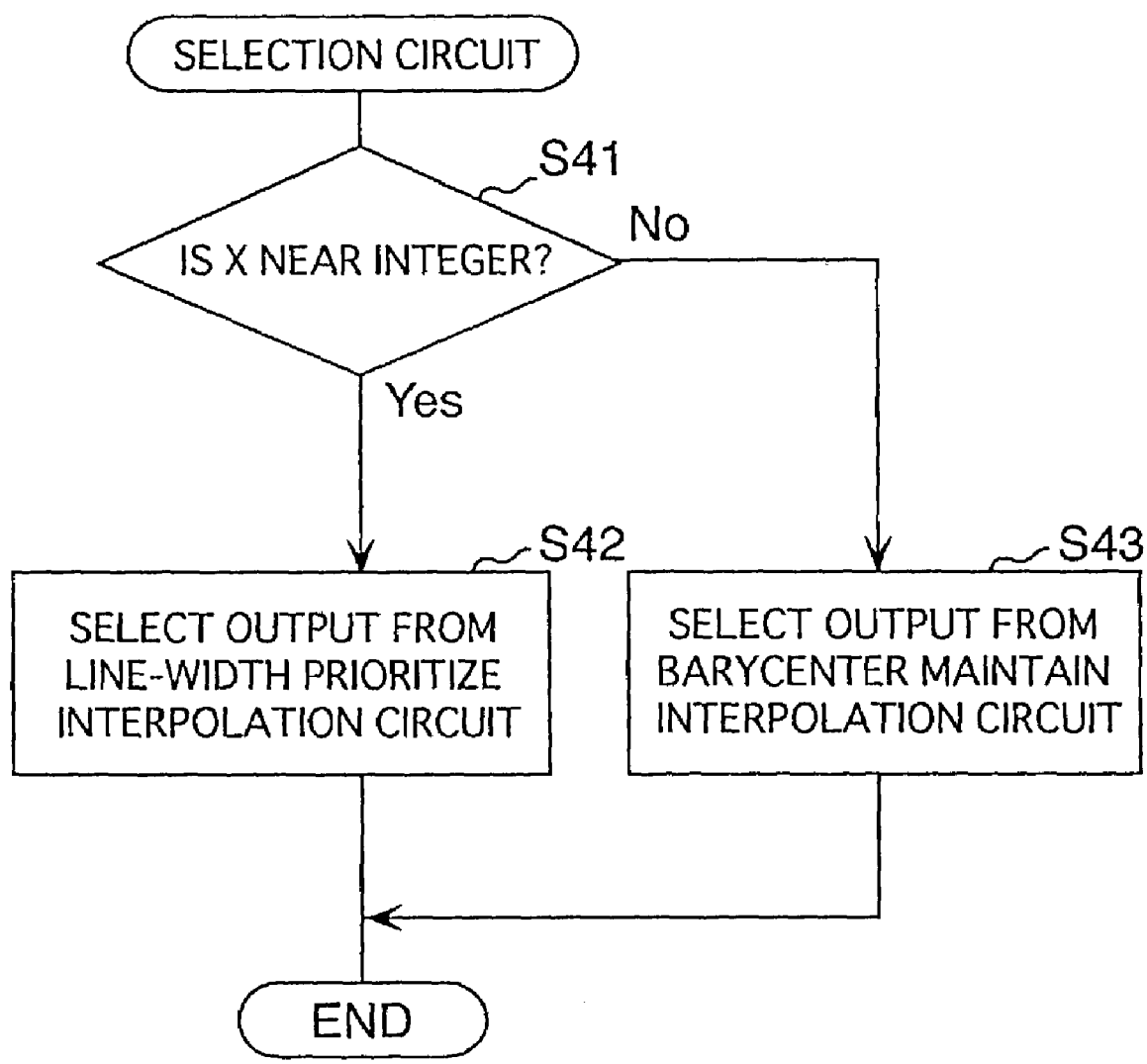
Figure 10:
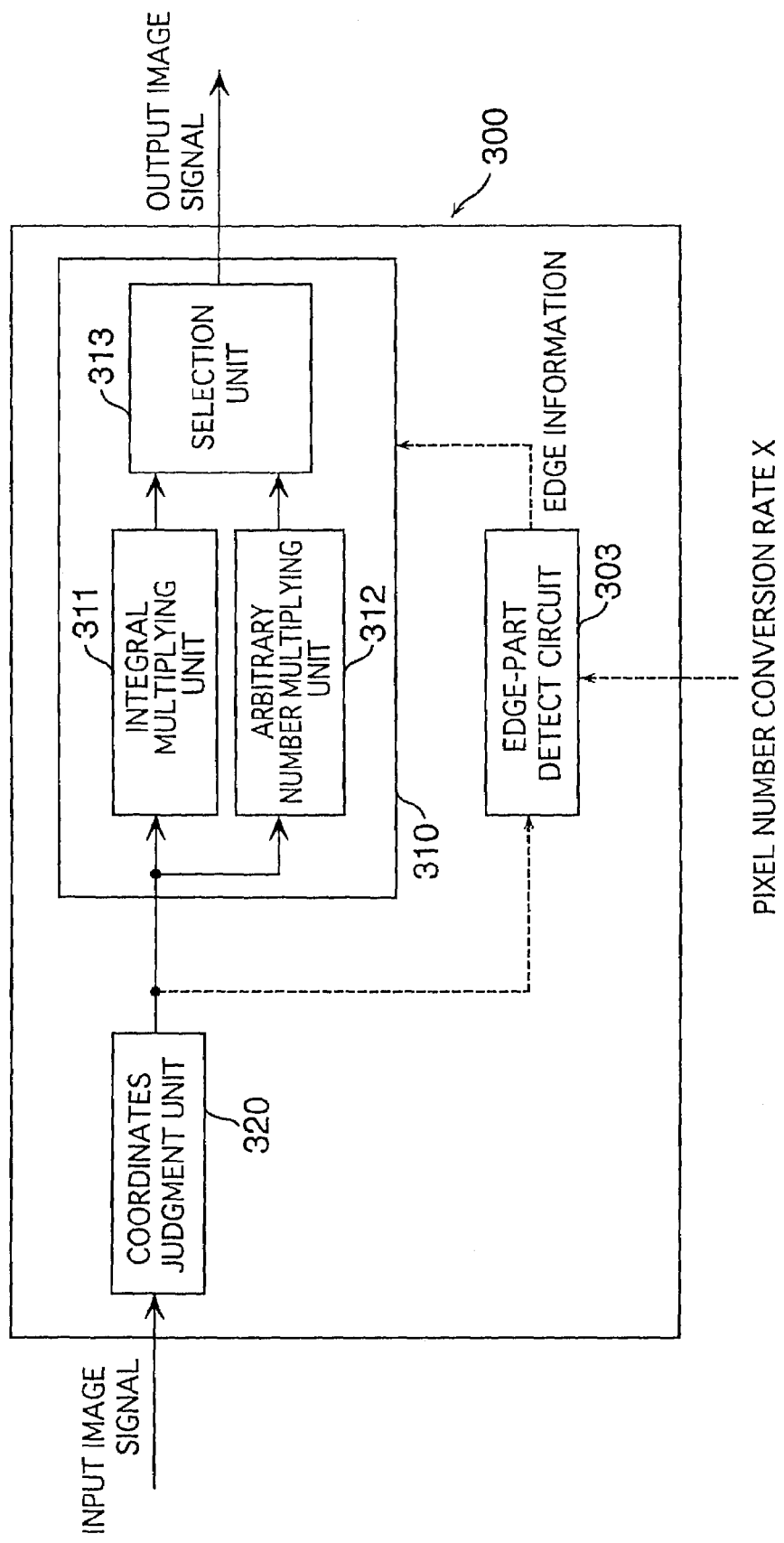
Figure 11:
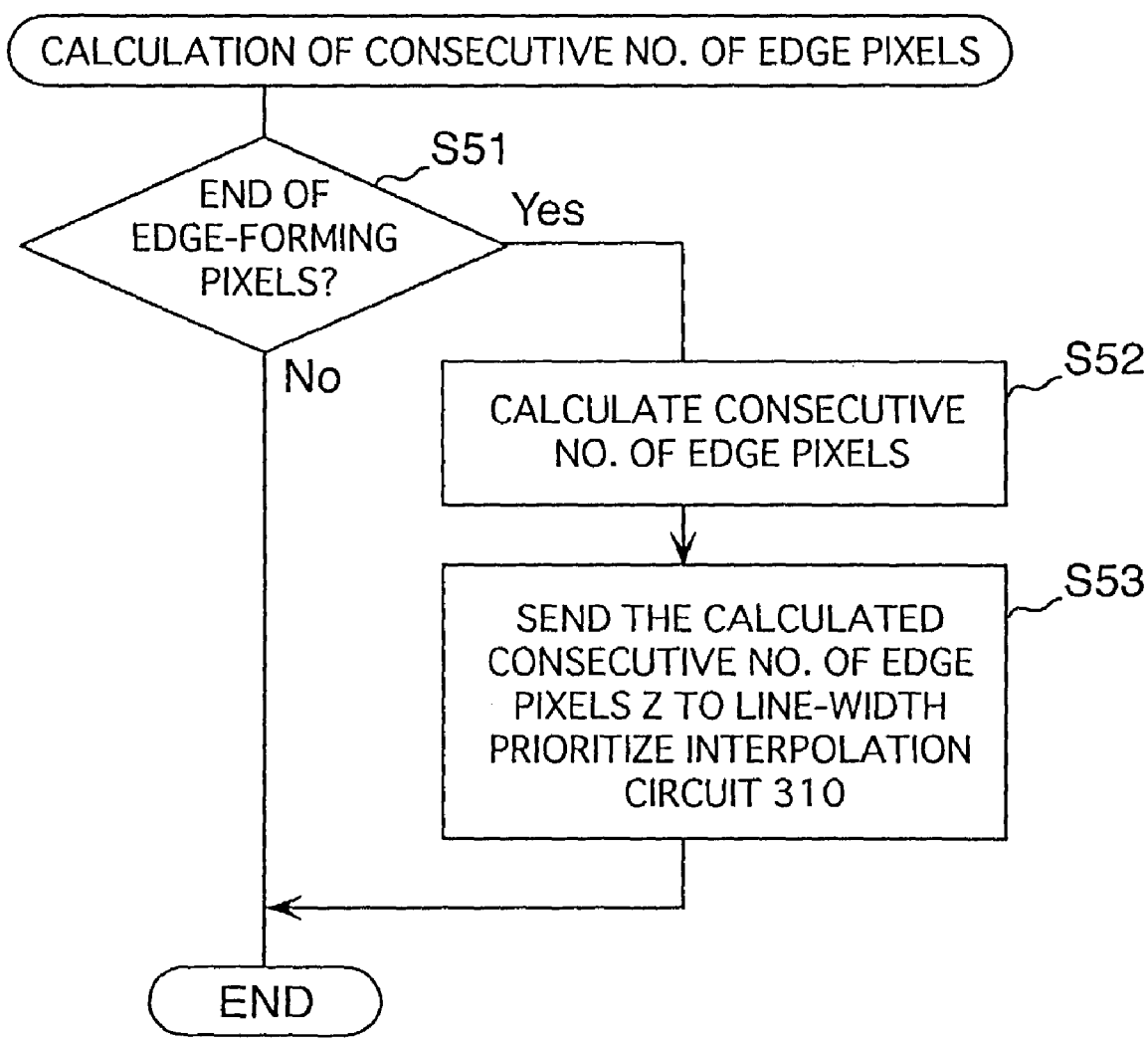
Figure 12:
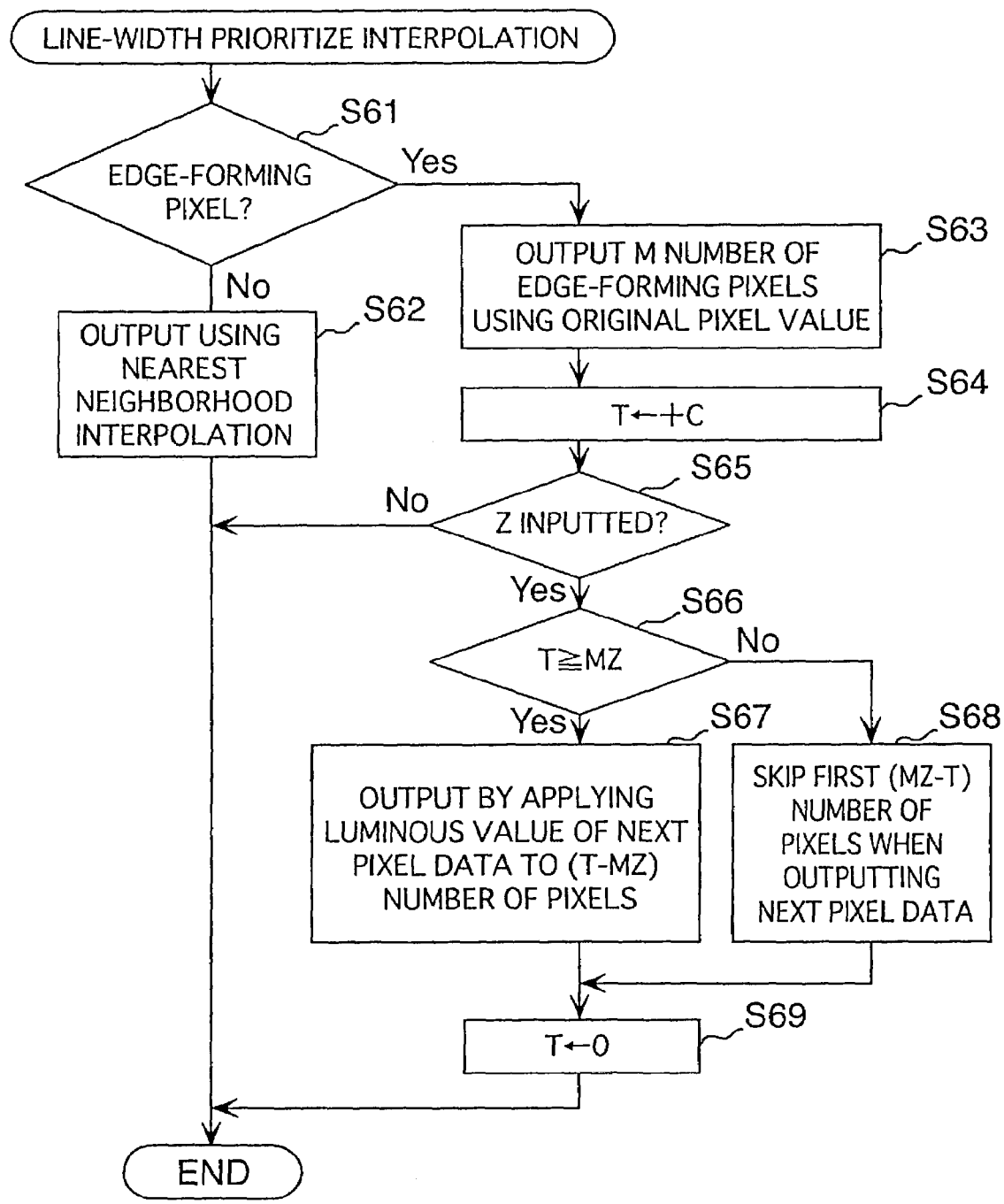
Figure 13:
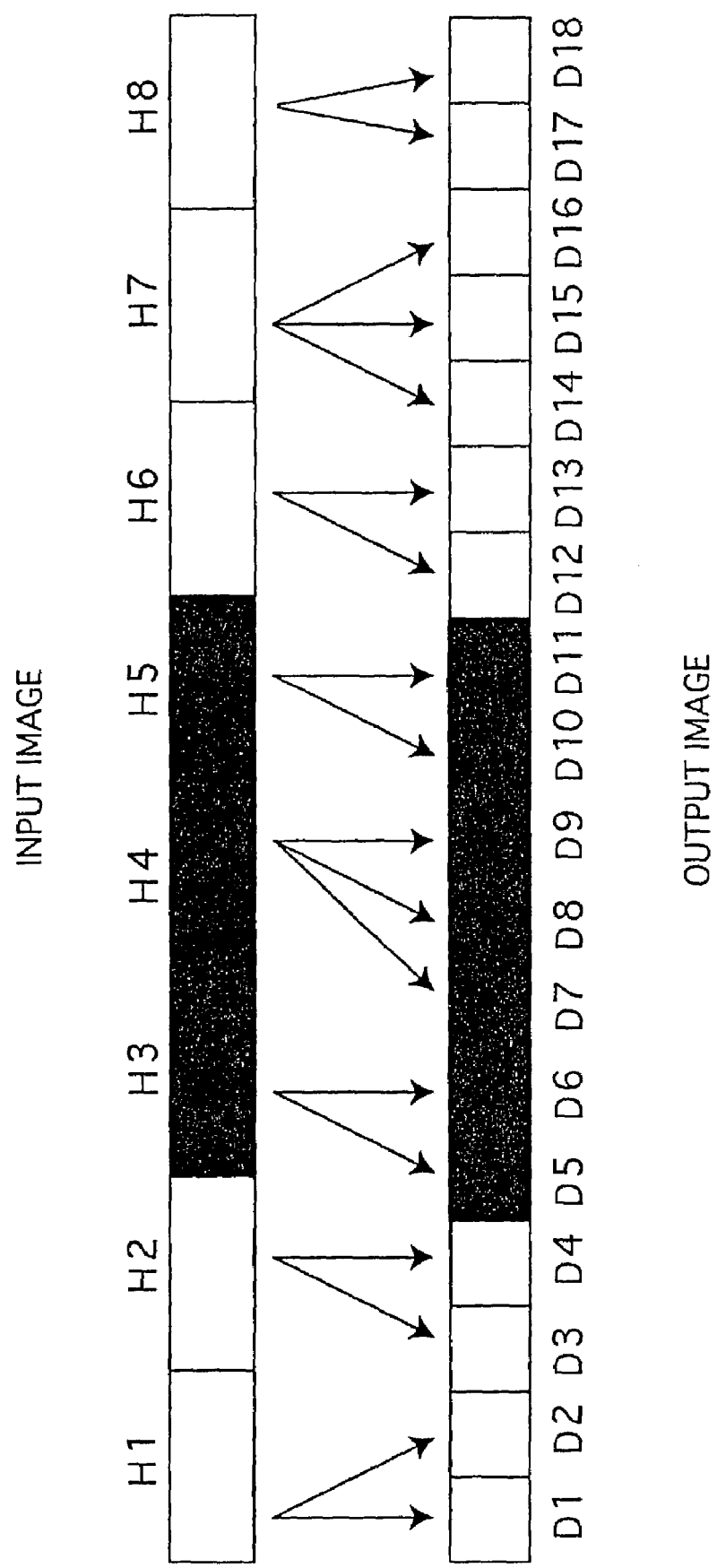
Figure 14:
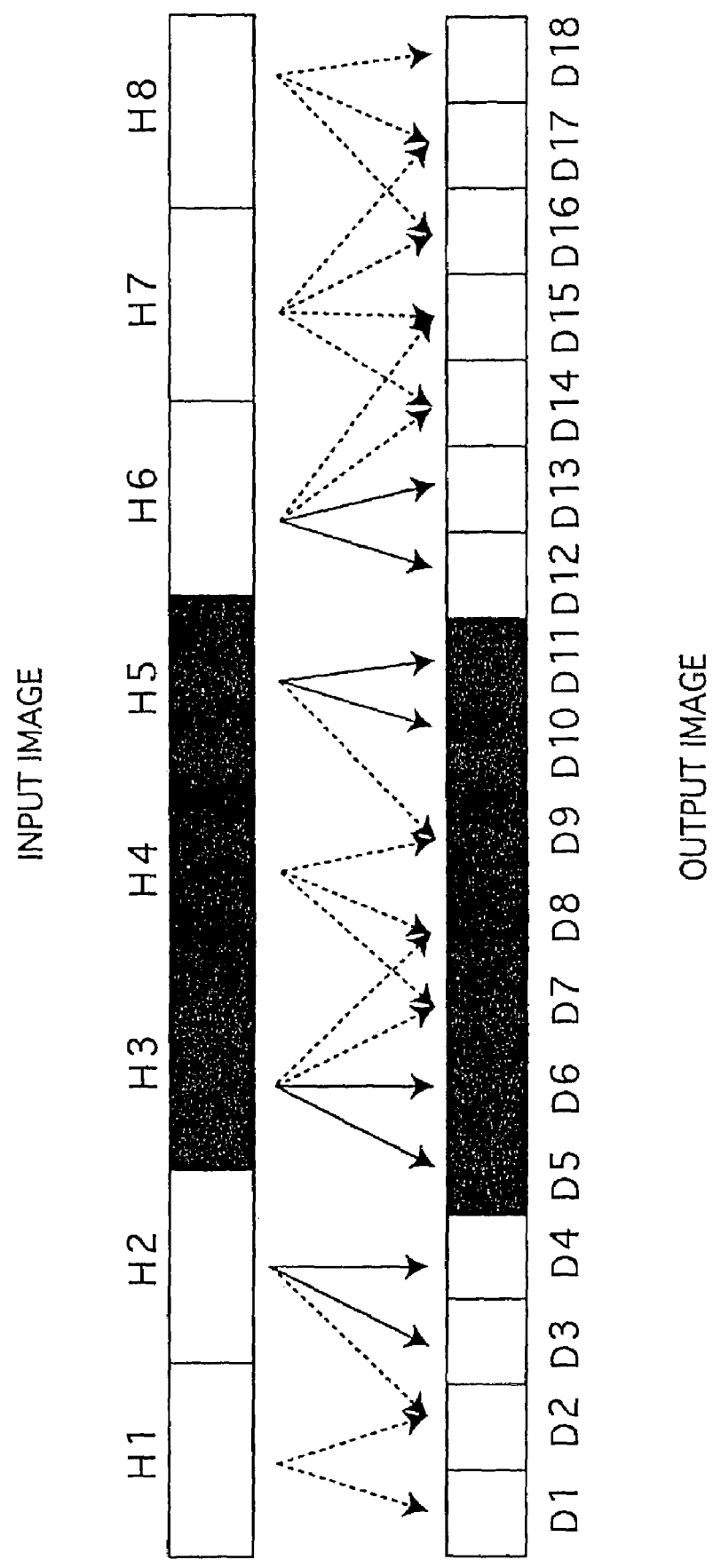
Figure 15:
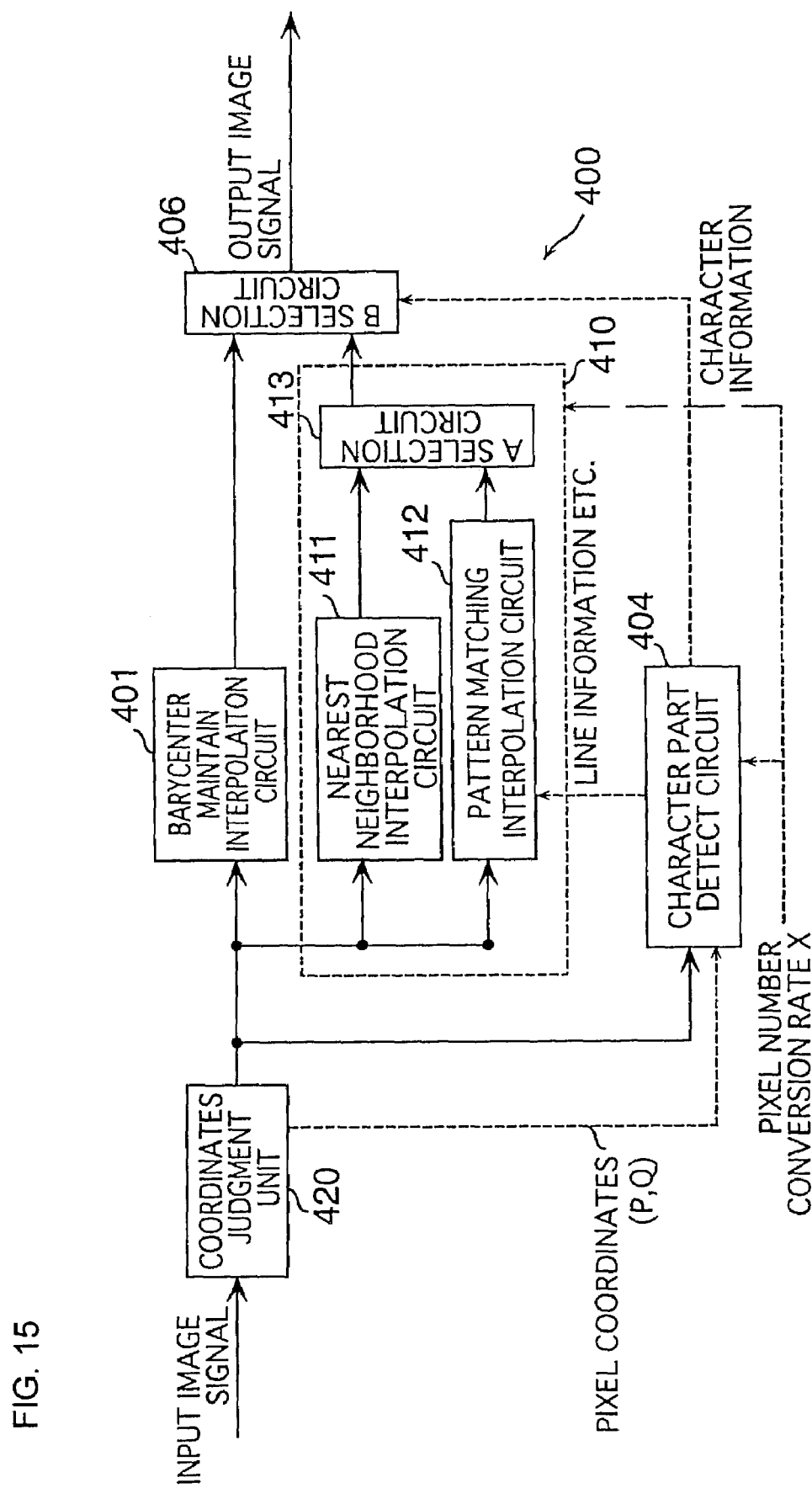
Figure 17:
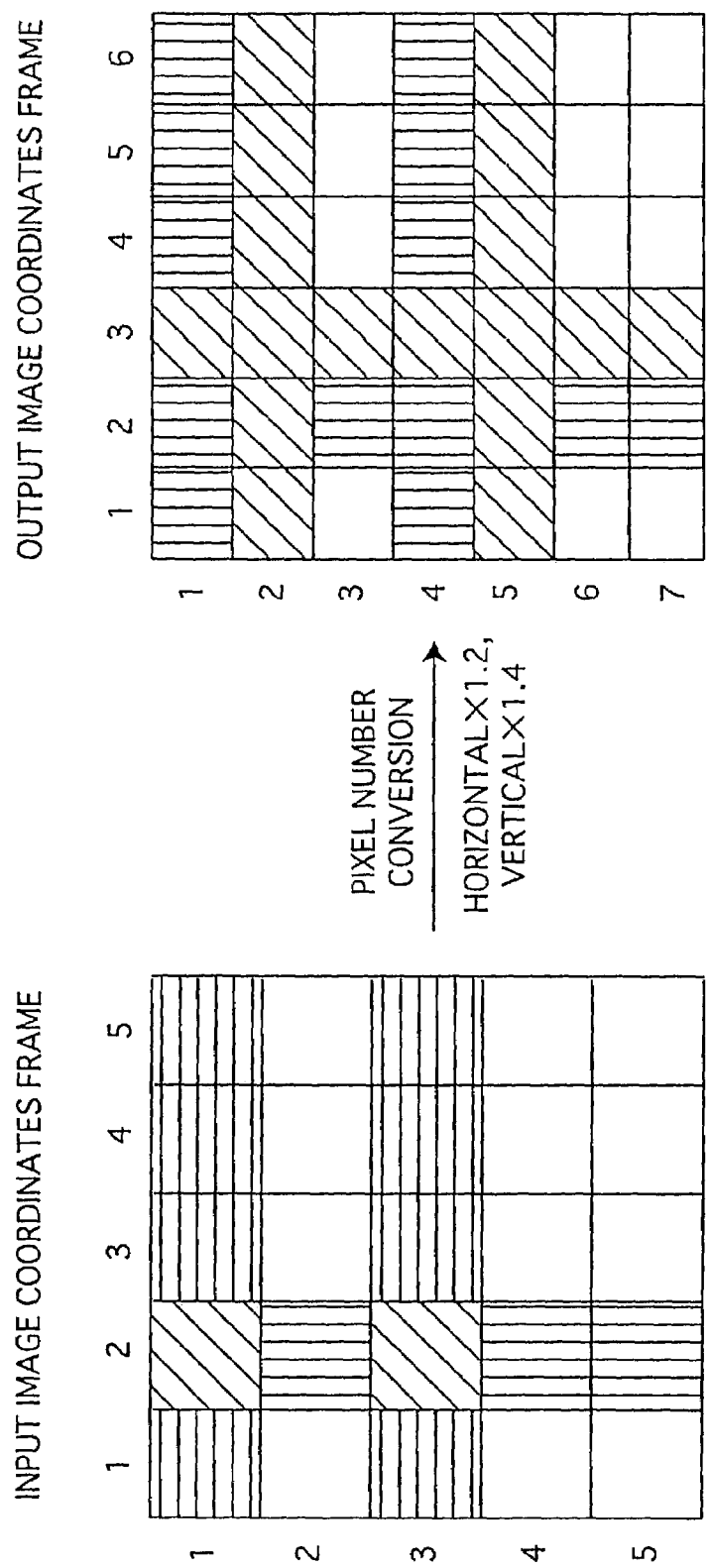
Figure 20A:
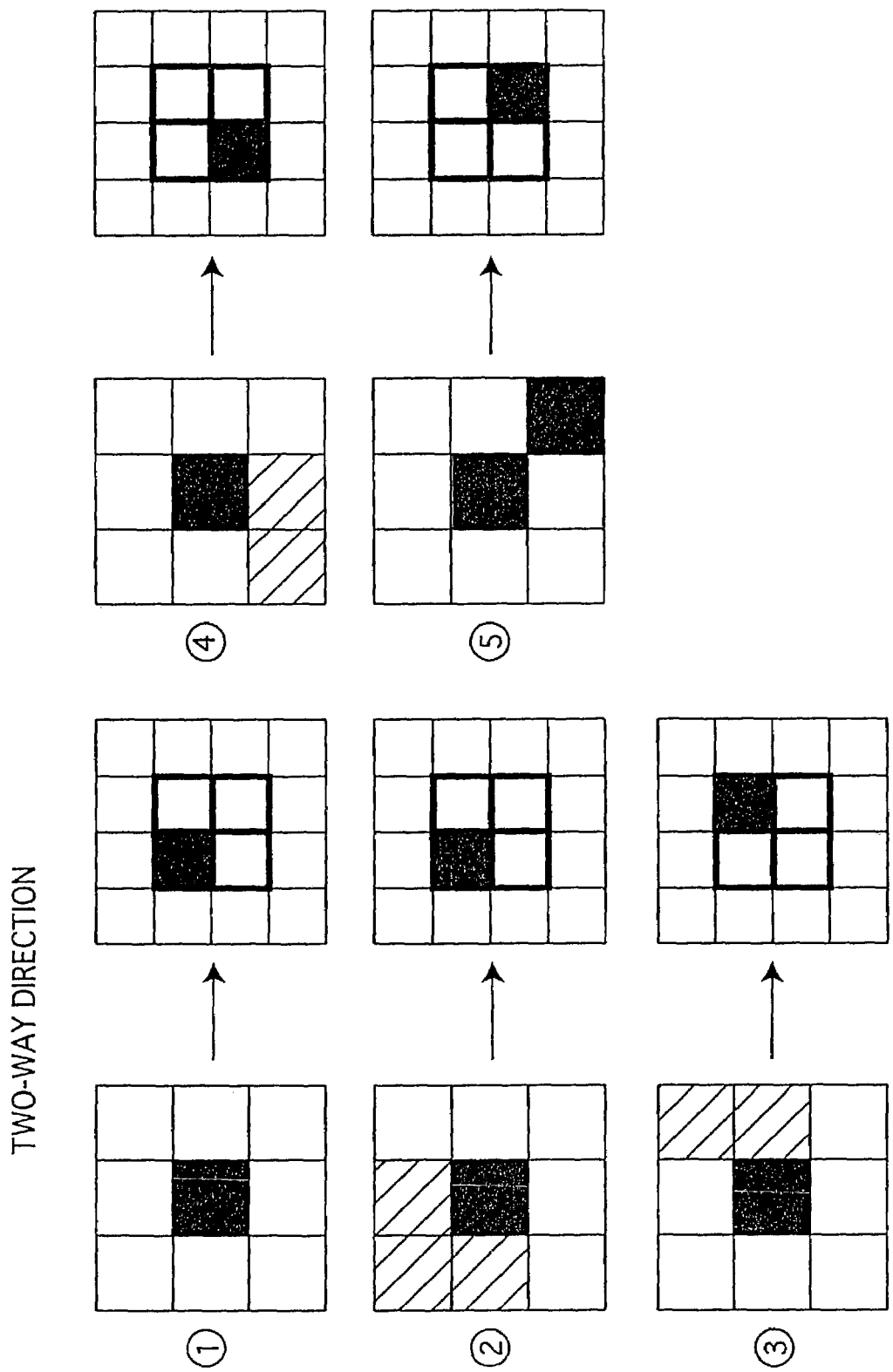
Figure 21:
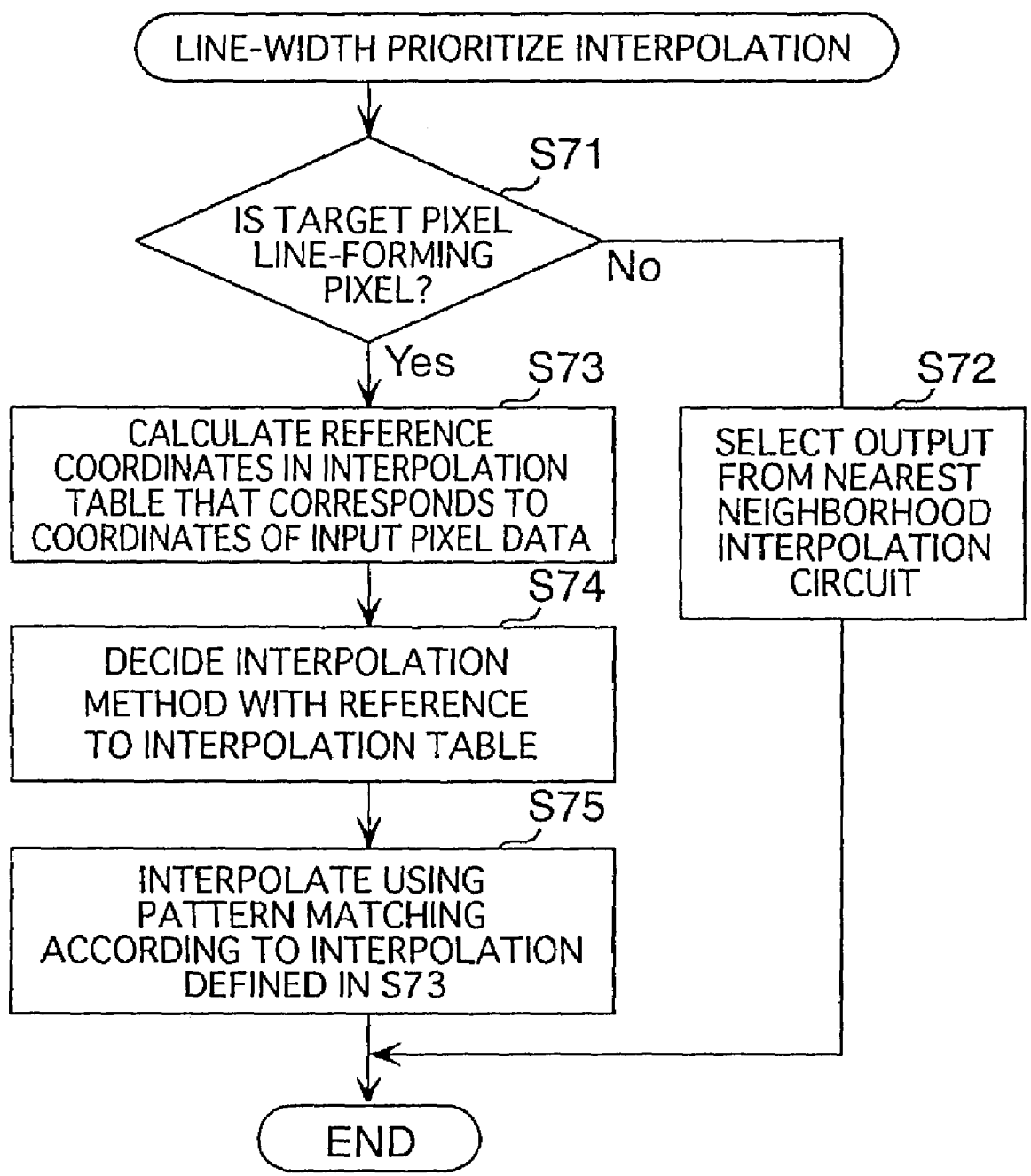
Figure 22:
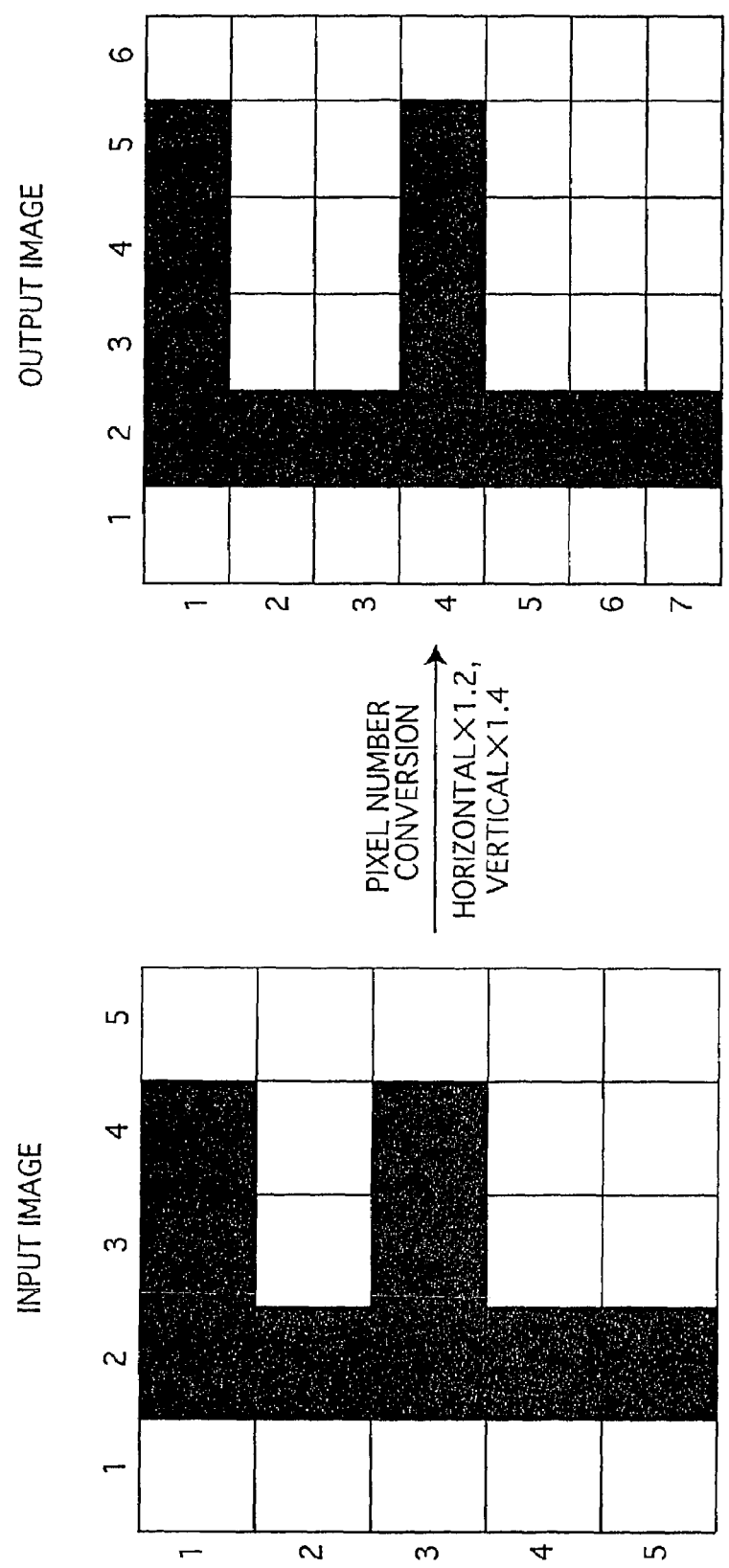
Figure 23:
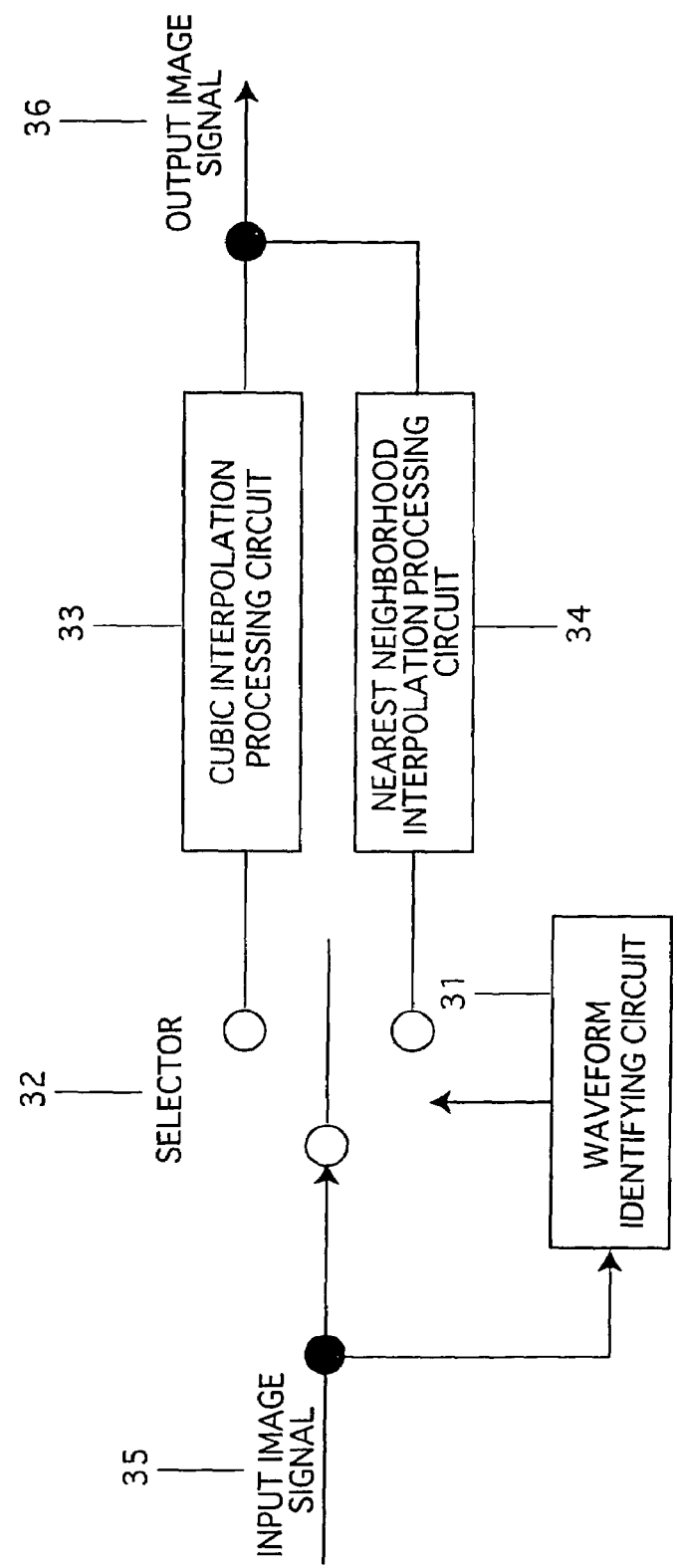
Figure 24B:
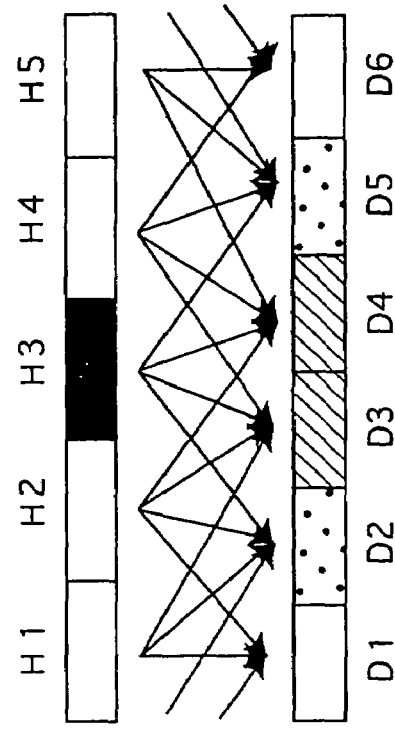
Figure 24A:
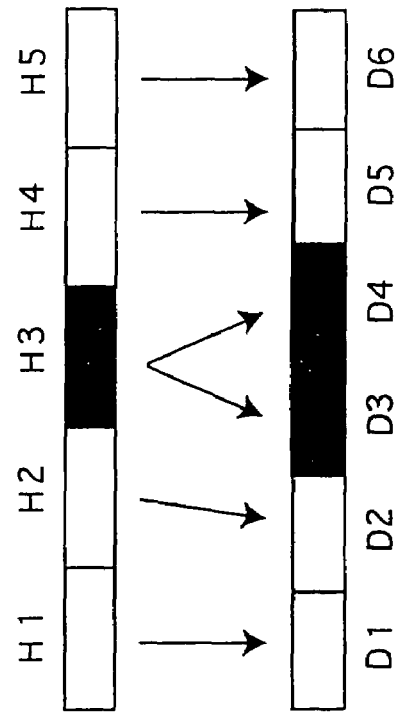
Figure 24C:
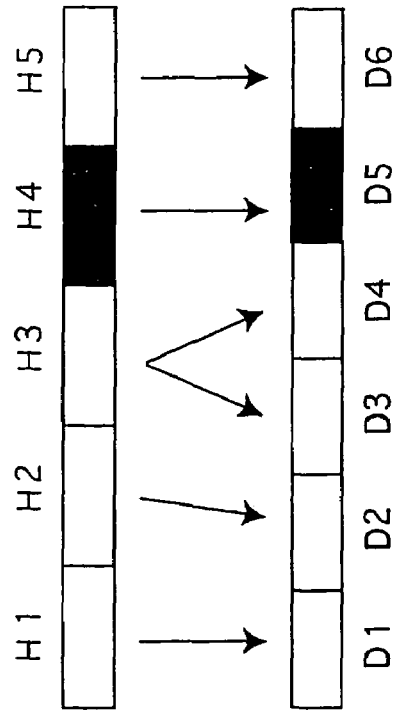

FIGS. 7A, 7B, and 7C are diagrams depicted for comparing the line-width prioritize interpolation and other interpolation methods;

FIG. 8 is a block diagram showing an image processing apparatus according to the second embodiment;

FIG. 9 is a flow chart showing an operation of a selection circuit in the image processing apparatus;

FIG. 10 is a block diagram showing an image processing apparatus according to the third embodiment;

FIG. 11 is a flow chart showing an edge consecutive number calculation according to the third embodiment;

FIG. 12 is a flow chart showing an example of the operation performed by the line-width prioritize interpolation circuit according to the third embodiment;

FIG. 13 is an illustrative picture showing a pixel number conversion according to the third embodiment;

FIG. 14 is an illustrative picture showing a pixel number conversion according to the third embodiment;

FIG. 15 is a block diagram showing an image processing apparatus according to the fourth embodiment;

FIG. 16 is an example interpolation table according to the fourth embodiment;

FIG. 17 is used to explain the image processing according to the fourth embodiment;

FIGS. 18A and 18B are pattern matching conversion tables according to the fourth embodiment;

FIGS. 19A and 19B are pattern matching conversion tables according to the fourth embodiment;

FIGS. 20A and 20B are pattern matching conversion tables according to the fourth embodiment;

FIG. 21 is a flow chart showing an operation performed by a line-width prioritize interpolation circuit according to the fourth embodiment;

FIG. 22 is an example image used to explain the image interpolation according to the fourth embodiment;

FIG. 23 is a block diagram showing an image processing apparatus according to a conventional example; and FIGS. 24A, 24B, and 24C are diagrams showing pixel number conversions using nearest neighborhood interpolation and cubic interpolation.

BEST MODE FOR CARRYING OUT THE INVENTION

First Embodiment

Figure 1:
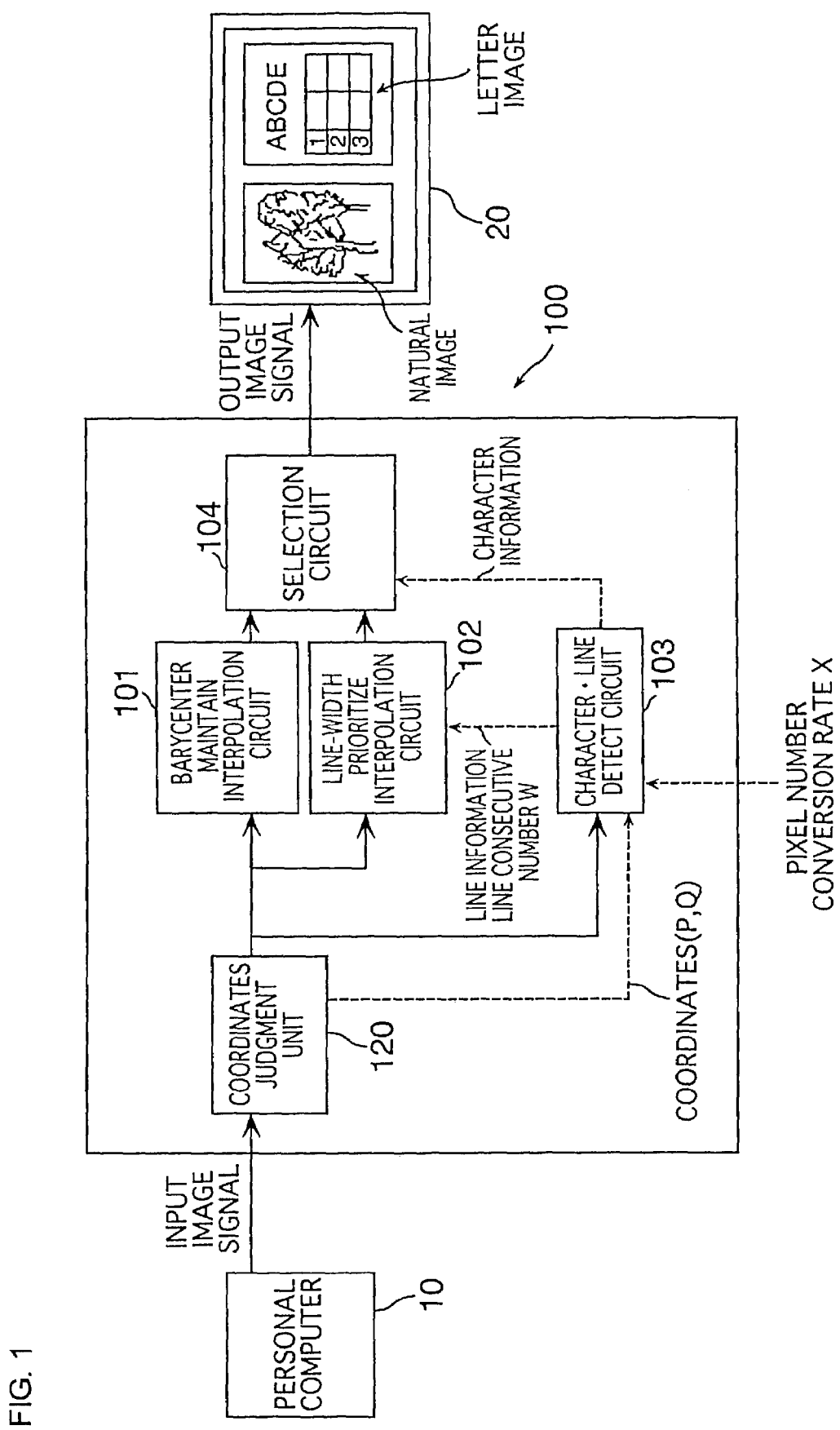
FIG. 1 is a block diagram showing an image processing apparatus according to the first embodiment of the present invention.

FIG. 1 is a block diagram showing an image processing apparatus according to the first embodiment of the present invention.

This image processing apparatus 100 is used to input an image signal (i.e. image data) outputted from a personal computer 10, to perform pixel number conversion at a pixel number conversion rate X that is set by an operator, and to output the result to a matrix-type display apparatus 20 such as PDP and LCD. In particular, the image processing apparatus 100 is used for inputting image signals corresponding to natural and letter images.

As FIG. 1 shows, the image processing apparatus 100 includes a barycenter maintain interpolation circuit 101, a line-width prioritize interpolation circuit 102, a character·line detect circuit 103, a selection circuit 104, a coordinates judgment unit 120, and the like.

First, the personal computer 10 sequentially sends pixel data (i.e. a luminous value corresponding to matrix coordinates on a screen) to the image processing apparatus 100. To facilitate understanding, assumption is made that pixel data of 8 bit each indicating a luminous value (0–255) for each set of pixel coordinates is sent sequentially for each line. Specifically, the personal computer 10 inputs pixel data of coordinates (1,1), (2,1), (3,1), . . . for the first line in this order, and for the second line, pixel data of coordinates (1,2), (2,2), (3,2), . . . in this order.

The coordinates judgment unit 120 obtains pixel coordinates (P,Q) that show which coordinates the pixel data corresponds to. In the stated set of coordinates, P signifies a horizontal coordinate, and Q signifies a vertical coordinate. Then, the coordinates judgment unit 120 sends the coordinates (P,Q) to the character·line detect circuit 103.

The judgment performed by the coordinates judgment unit 120 is performed as follows for example. A horizontal coordinate P is obtained by counting each piece of pixel data inputted after a signal indicating a beginning of a group of signals has been inputted, and a vertical coordinate Q is obtained by counting a signal indicating a beginning of each line after a page of image signals have been inputted.

Firstly, the description focuses on only the pixel number conversion in the horizontal direction for facilitating understanding.

The image processing apparatus 100 includes a reception unit (not shown in the figures) for receiving instructions on a conversion rate from an operator. The reception unit is designed to send the pixel number conversion rate X to each unit.

The character·line detect circuit 103 judges, each time an image signal is inputted, whether the target pixel has a character as letter image, and whether the target pixel is a line-forming pixel or a peripheral pixel (i.e. non-line-forming pixel). Further, W is counted which indicates a number of consecutive line-forming pixels in the horizontal direction. Note that the counted W signifies a length of the line in the horizontal direction.

The barycenter maintain interpolation circuit 101 and the line-width prioritize interpolation circuit 102 both performs pixel number conversion on inputted pixel data at the conversion rate X. The barycenter maintain interpolation circuit 101 adopts a method for converting number of pixels so as to maintain barycenter of the luminous value (i.e. gradation value) before and after the conversion. Concretely, linear interpolation and cubic interpolation and the like are adopted.

The line-width prioritize interpolation circuit 102 basically performs interpolation by using the luminous value of the pixel as it is which is nearest to the coordinates of the target pixel before conversion. However, when inputted pixel data is of the line-forming pixel, the method is different from the nearest neighborhood interpolating method in that adjustment is made so as to satisfy output number of the line-forming pixel being an integer obtained from multiplying a number of the sum of the line-forming pixels "W" by a pixel number conversion rate X, as well as satisfying, on the whole screen, that a converted image has an adequate number of pixels based on the pixel number conversion rate Here, in obtaining an integer from "W"×"X", it is possible to adopt a method of dropping the fractional portion of the number, or a method of rounding up the number. In this embodiment, however, a method of rounding off the number to the nearest integer to obtain [consecutive number of inputted line-forming pixels "W"×pixel number conversion rate "X"]. Hereinafter, a number with [ ] represents an integer obtained by dropping the fractional portion of the actual number in which is obtained by the expression in the [ ].

In addition, this embodiment assumes that the input coordinates (P,Q) and the output coordinates (p,q) that are positioned nearest to the input coordinates (P,Q) both satisfy the following expressions 1 and 2. (In this example, the conversion rate in the vertical direction is 1 (i.e. q=Q). Therefore, only expression 1 should be satisfied.)

$$[\{P-1\} \times X] \, p \leq [P \times X] \qquad \text{expression 1}$$

$$[\{Q-1\} \times X] \, q \leq [Q \times X] \qquad \text{expression 2}$$

Image signals outputted from both of the barycenter maintain interpolation circuit 101 and the line-width prioritize interpolation circuit 102 are arranged to sequentially output, for each line, pixel data that has been converted according to the pixel number conversion. Note that the speed of outputting the signals corresponding to converted images is arranged to be X times the speed at which the image signal is inputted.

The selection circuit 104 selects a series of pixel data; either a series outputted from the barycenter maintain interpolation circuit 101 or a series from the line-width prioritize interpolation circuit 102. Both series of pixel data have been outputted concurrently from each circuit. That is, for the output pixel data that corresponds to the pixel data judged to be a character part by the character·line detect circuit 103, pixel data from the line-width prioritize interpolation circuit 102 is selected. And for the output pixel data that corresponds to the pixel data judged to be a non-character part, pixel data from the barycenter maintain interpolation circuit 101 is selected.

Note that a pixel data line memory is installed, in the character·line detect circuit 103, for temporarily storing several lines of pixel data on which to be performed detection. Accordingly, it is arranged that an image signal will reach, with four lines delay, the barycenter maintain interpolation circuit 101 and the line-width prioritize interpolation circuit 102. In addition, the pixel data line memory will assign, to one frame of picture, a signal representing a beginning of image signals, and a signal representing a beginning of each line.

(Operation of the Character·Line Detect Circuit 103)

First, an example is described as to a character part judgment and a line judgment, which are performed by the character·line detect circuit 103.

The character·line detect circuit 103 first examines a pixel (P,Q−3) to be a target pixel which is inputted three lines before the inputted pixel coordinates (P,Q), then judges whether or not the target pixel is a character part (i.e. a part that has a character as letter image), and then judges whether the target pixel is a line-forming pixel or a line peripheral pixel.

Figure 2:
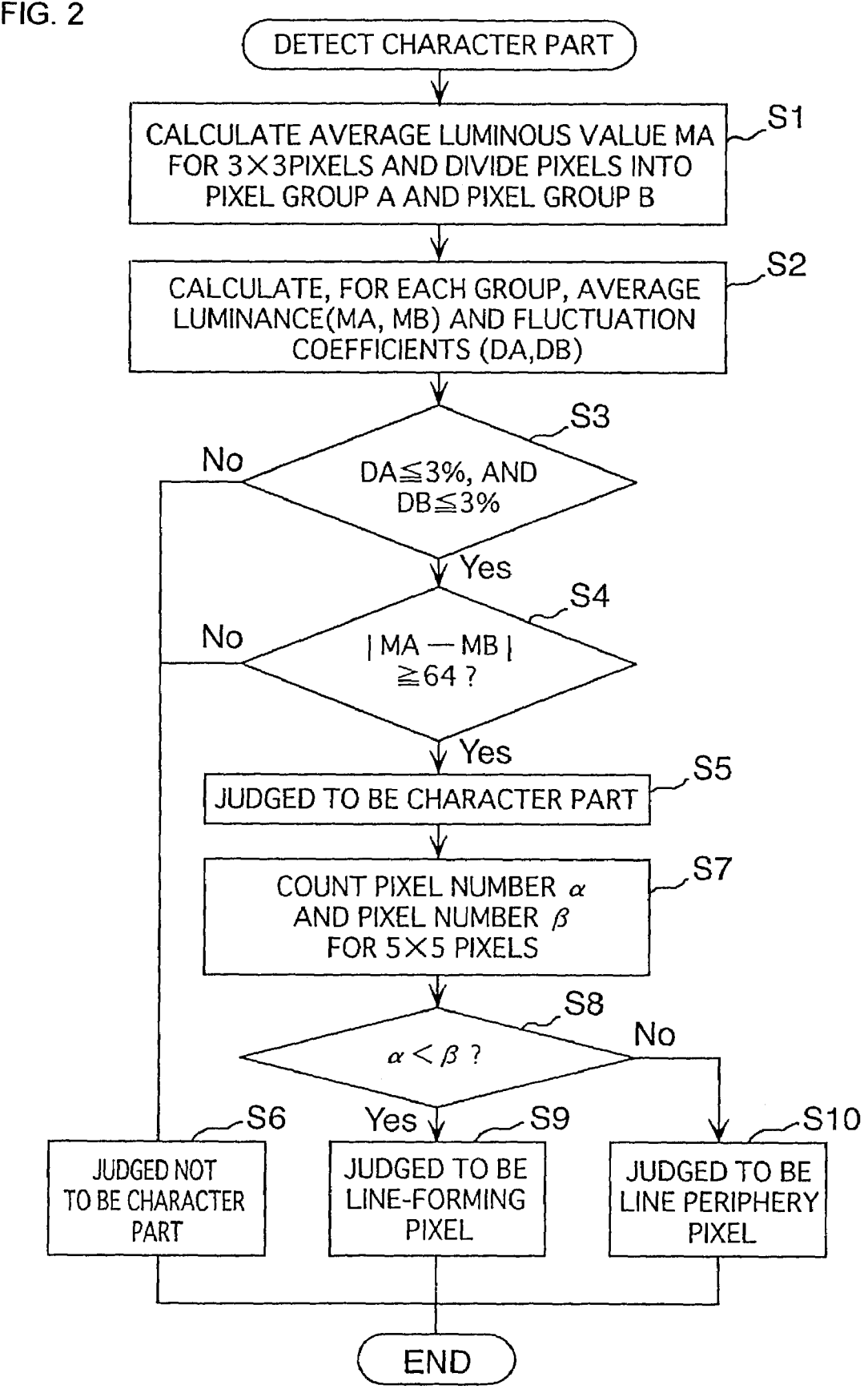
FIG. 2 is a flow chart showing a character part detect operation and a line detect operation that are related to the first embodiment.

FIG. 2 is a flow chart depicting a character part detecting and line detect operation performed by the character·line detect circuit 103. The character·line detect circuit 103 performs an operation shown in this flow chart every time pixel data is inputted.

First, an average luminance value MA is calculated with reference to the pixel data line memory as for the 3×3 pixel frame developed around the target pixel (P,Q–3).

The pixel group included in the 3×3 pixel frame is divided into two groups; one group a group of pixels having the average luminance value MA or more, and the other group being a group of pixels having less luminance than the average luminance MA. The pixel group including the target pixel is named group A, and the other group is named group B (Step S1).

Next, for the group A, the average luminance value MA and the fluctuation coefficient DA are calculated. Likewise, the average luminance value MB and the fluctuation coefficient DB for the group B are calculated (Step S2).

It is tested whether the fluctuation coefficient DA of the group A and the fluctuation coefficient DB are both 3% or smaller, and whether the difference between the average luminance value MA for the group A and the average luminance value MB for the group B is 64 or greater (Step S3, S4).

Finally, if both of the conditions are met at Step S3 and Step S4, the target pixel is judged to be of a character part (S5).

And if not both conditions of Step S3 and Step S4 are met, the target pixel is judged not to be of a character part (S6).

When the target pixel is judged to be of a character part, a test is further conducted in the following manner as to whether the target pixel is a line peripheral pixel or not.

First, as for the wider dimension (5×5 pixels) than that used for the test at the Step S1, a that represents a number of pixels having a luminous value in the range of MA±3% and β that represents a number of pixels having a luminous value in the range of MB±3% are calculated (Step S7).

If the pixel number α is smaller than the pixel number β, the target pixel is judged to be a line-forming pixel (S8→S9), and if the pixel number α is no smaller than the pixel number β, the target pixel is judged to be a line peripheral pixel (S8→S10).

The reason why it is possible to judge that the α side is a letter-forming pixel group from the relation α<β being satisfied is that if it is a letter image, generally when a part with a certain dimension is taken for comparing α and β as seen in the Steps S7–S10, there should be more aggregate number of background-forming pixels than an aggregate number of letter-forming pixels. It is especially effective to use the above method for judging whether a pixel is a line-forming pixel or not if the pixel is forming alphabet and the like.

In the above description, 5×5 pixel frame is taken as an example for conducting a test. However, empirically speaking, a test using a frame with more than letter point included in a screen yields a detect result of high precision. And wider the dimension of the frame (e.g. 13×13 pixels), even more improved precision will be achieved.

Note that the method performed by the character·line detect circuit 103 for judging whether the pixel is a character part is not limited to the above stated example, and may include other examples such as a method by which first the space frequency is measured in an area of a certain dimension around a target pixel, then it is judged to be a character part when the measured space frequency is high.

In addition, the method of detecting a line-forming pixel performed by the character·line detect circuit 103 is not limited to the above, and can include a method which will be described in the third embodiment. In this method, an edge part is detected first which has a great difference in luminance compared to the adjacent pixels in the horizontal direction, and when a difference in luminance between edge parts is small it is judged that the pixels between the edge parts are line-forming pixels.

Further, for example, when a graphical driver of a personal computer performs a pixel number conversion, a method is also possible for detecting whether the pixel is line-forming by installing a circuit that can directly recognize whether it is a line-forming pixel in association with OS of the personal computer.

The character·line detect circuit 103 includes a detect result line memory which temporarily stores this detect result (i.e. character information showing whether each pixel is a character part or not, and line information showing whether each pixel is a line-forming pixel or not), which enables to store thereon the character information and the line information on the pixel data currently being inputted up to the pixel data having been inputted four lines before the pixel data being currently inputted.

Then, the above result being detected by the character·line detect circuit 103 will be sent to the line-width prioritize interpolation circuit 102 and to the selection circuit 104.

Specifically, the character·line detect circuit 103 sends line information on (P,Q–4) in the detect result line memory to the line-width prioritize interpolation circuit 102, since the pixel data that goes through the line-width prioritize interpolation circuit 102 is pixel data which has been inputted four line before the currently inputted pixel data. Before this operation, conversion is performed so that the number of the character information outputted at a time will be × times the number of the original character information. This operation enables the selection circuit 104 to sequentially judge the pixel data after pixel number conversion.

Here, the judging operation is described using a specific example of an input image signal.

Figure 3B:
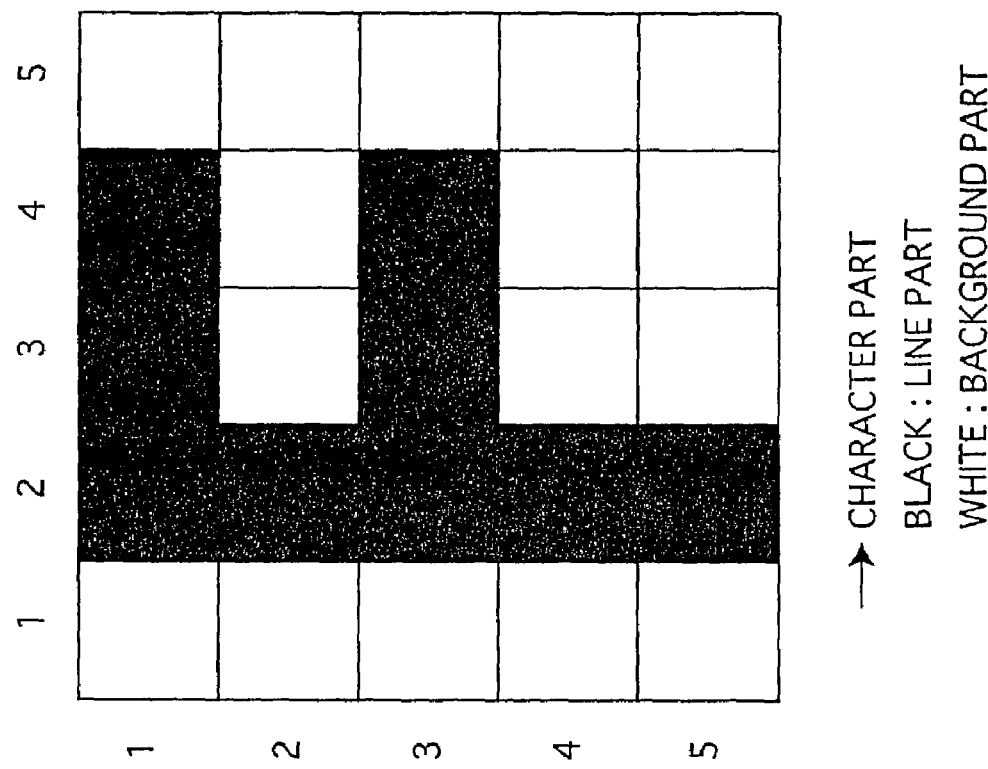
FIGS. 3A and 3B are charts showing an example of the input image signal that is applied with a frame with a given dimension.
Figure 3A:
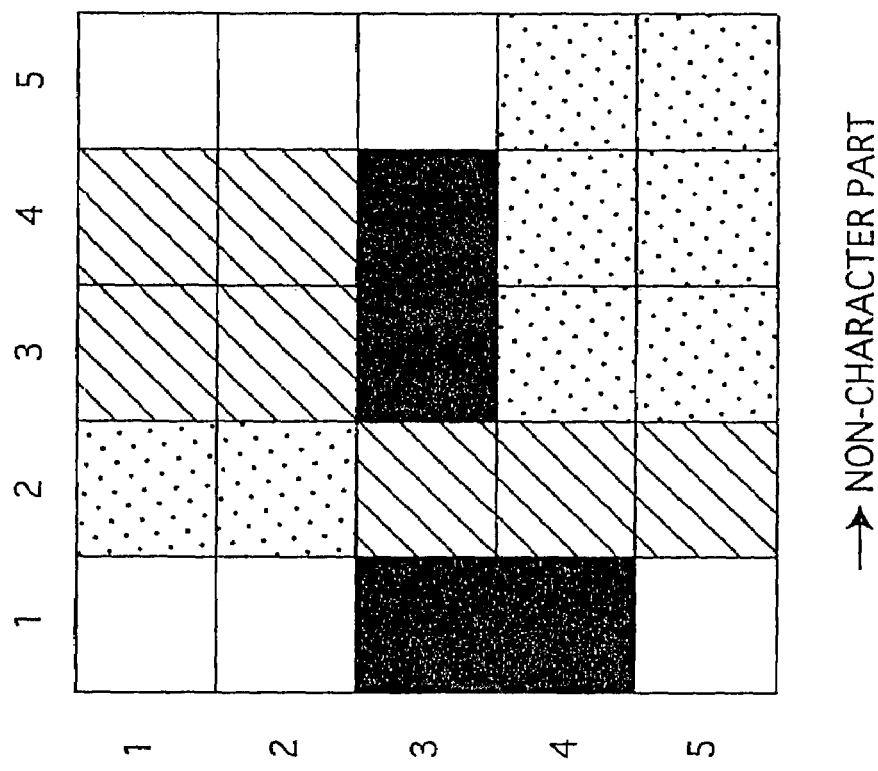

FIGS. 3A and 3B are drawn to show one example of the input image signal with a 5×5 pixel frame having a target pixel at the center. In FIGS. 3A and 3B, coordinates (a,b) represent that the horizontal position is a and the vertical position is b in the 5×5 pixel frame.

In FIGS. 3A and 3B, a pattern in each set of pixel coordinates represents a pixel luminous value. For example, the black pixel represents a low luminance (a luminous value of around 0), the oblique shadow pixel represents a medium-low luminance (a luminous value of around 64), the black-dot shadow pixel represents a medium luminance (a luminous value of around 128), and the white pixel represents a high luminance (a luminous value of around 255).

For example, if the 5×5 frame centers around the target pixel as depicted in FIG. 3A will be judged not to be a character part since a fluctuation coefficient DA or DB for the 3×3 pixel group centers for each pixel will be large in value.

On the other hand, 5×5 pixel frame is as depicted in FIG. 3B, a fluctuation coefficient DA for a pixel group A and a fluctuation coefficient DB for a pixel group B are both in the vicinity of 0, the group A consisting of the nine pixels: (2,1), (3,1), (4,1), (2,2), (2,3), (3,3), (4,3), (2,4), (2,5), and the group B consisting of the other 16 pixels. Further, the difference between an average luminous value MA for the line-forming pixel group and an average luminous value MB for peripheral pixel group is around 255. Therefore, the target pixel is judged to be a character part. The pixel group A is judged to be the line-forming pixel group, and the pixel group B is judged to be a line peripheral pixel group.

Next, the line-width calculation operation performed by the character·line detect circuit 103 is described.

Figure 4:
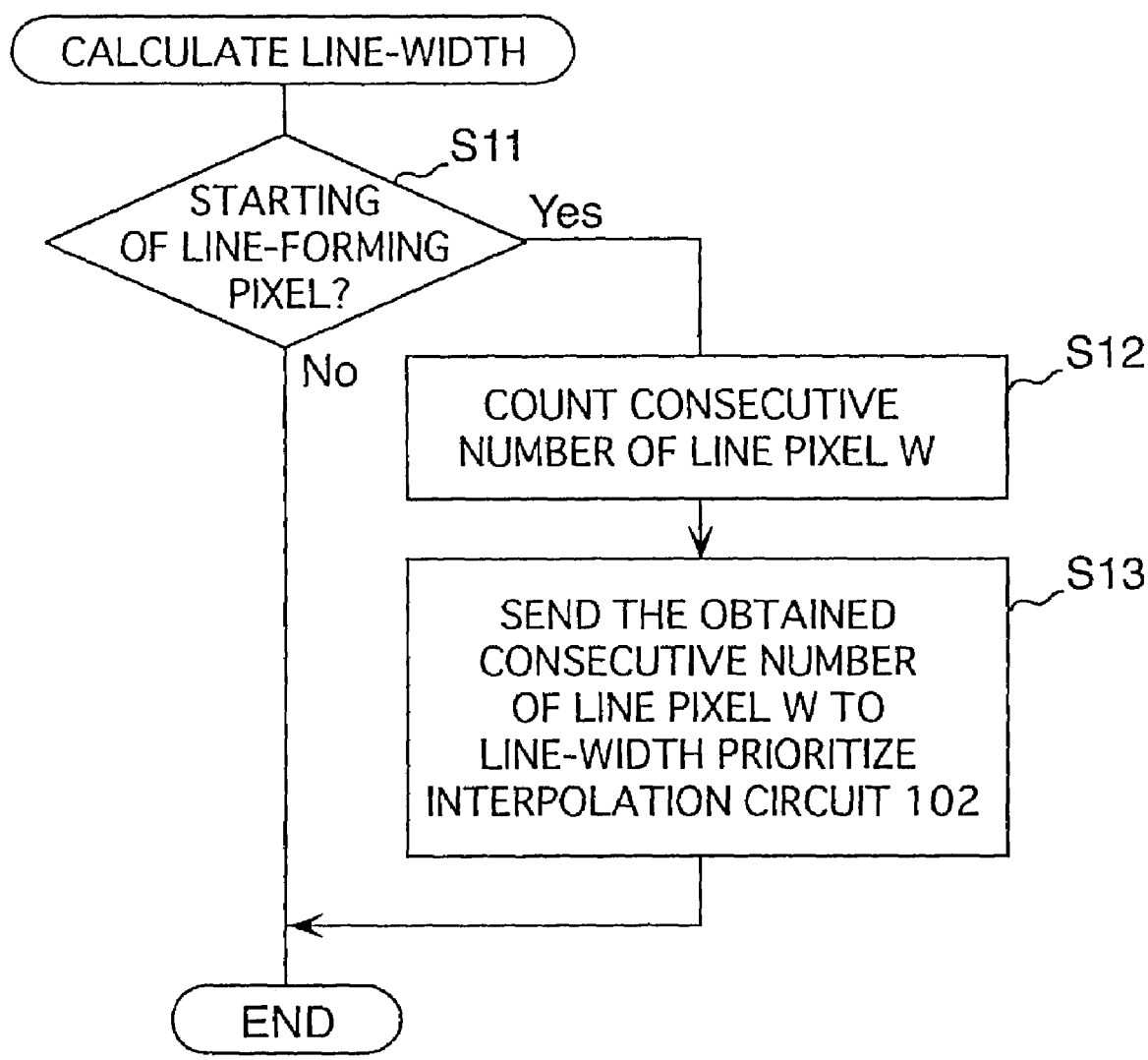
FIG. 4 is a flow chart showing a line-width calculation operation according to the first embodiment.

FIG. 4 is a flow chart showing a line-width calculation performed by the character·line detect circuit 103. This character·line detect circuit 103 performs operation shown in this flow chart every time pixel data is inputted.

The character·line detect circuit 103 first investigates whether the pixel data forming the coordinates (P,Q-4) which is currently being inputted shows a starting of a line-forming pixel (S11). If line information on the coordinates (P-1,Q-4) immediately before (P,Q-4) turns out to show a peripheral pixel and line information on the coordinates (P,Q-4) turns out to show a line-forming pixel, then (P,Q-4) represents a starting point of a line-forming pixel in the horizontal direction.

If the (P,Q-4) is a starting point of a line-forming pixel, a number of consecutive line-forming pixel in the horizontal direction is counted (i.e. consecutive number of line-pixels W) (S11→S12).

The detection at the above mentioned Step S11 is performed by applying a pattern matching method on the line information on the pixel coordinates (P,Q-4) stored on the detect result line memory and on the coordinates before and after (P,Q-4).

The obtained consecutive number of line pixels W is sent to the line-width prioritize interpolation circuit 102 (S13).

Further, the character·line detect circuit 103 sends pixel data on the coordinates (P+1,Q-4) which follows the coordinates (P,Q-4) to the line-width prioritize interpolation circuit 102 with reference to the pixel data line memory. (Note that this signal is used at Step S28 which will be mentioned in the description on the operation of the line-width prioritize interpolation circuit 102).

(Operation of Line-width Prioritize Interpolation Circuit 102)

The line-width prioritize interpolation circuit 102 is equipped with a counter T for counting how many pieces of pixel data are outputted from a starting of the line-forming pixel, each time a line-forming pixel is inputted.

Figure 5:
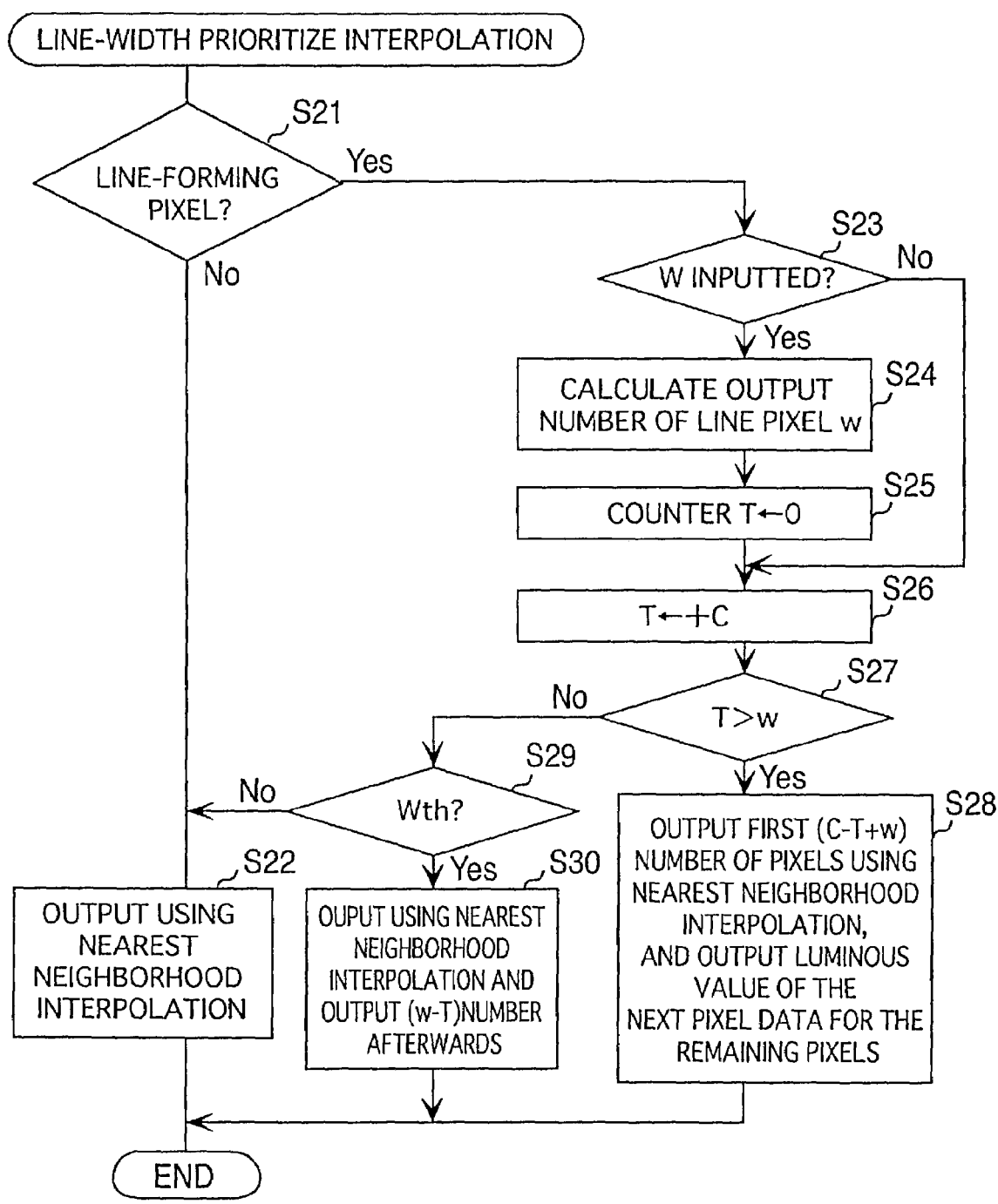
FIG. 5 is a flow chart showing an operation performed by the line-width prioritize interpolation circuit according to the first embodiment.

FIG. 5 is a flowchart showing an example of an operation performed by the line-width prioritize interpolation circuit 102.

The line-width prioritize interpolation circuit 102 performs the operation shown in FIG. 5 every time pixel data is inputted.

When the line information inputted from the character·line detect circuit 103 represents a peripheral pixel, (i.e. S21=No), this means that the pixel data of (P,Q-4) being currently inputted in the line-width prioritize interpolation circuit 102 is a peripheral pixel. In this case, nearest neighborhood interpolating is performed (Step S21→S22).

On the other hand, when the line information inputted from the character·line detect circuit 103 represents a line-forming pixel, and that a signal representing a consecutive number of line pixels W is inputted from the character·line detect circuit 103, this means that the pixel data inputted currently in the line-width prioritize interpolation circuit 102 is a starting of a line-forming pixel in the horizontal direction. Then, a number of line pixels w is calculated which shows how many pieces of line-forming pixels should be outputted consecutively after conversion based on this consecutive number of line pixels w. This number of line pixels w is an integer obtained from (consecutive number of line pixels W)×(conversion rate X). Specifically it is obtained from the expression w=[W×X] (S23→S24). Then the counter T is reset to the initial condition (S25), and adds, to the counter T, an output pixel number C (i.e. p in the above mentioned expression 1) which is situated nearest to the pixel data (P,Q-4) being currently inputted (S26).

On the other hand, when line information sent from the character·line detect circuit 103 shows that it is a line-forming pixel, and that a signal of consecutive number of line pixels W is not inputted from the character·line detect circuit 103, this means that there is a preceding line-forming pixel. In this case, the counter T will not be reset and just add the output pixel number C which is nearest to the pixel data (P,Q-4) being currently inputted (S23→S26).

Next, the line-forming pixels are outputted consecutively by the number corresponding to [consecutive number of line pixels W×conversion rate X] by performing operation from the steps S27–S30 detailed in the following. First, if the number counted at the counter T exceeds w, nearest neighborhood interpolation is used to output the first (C−T+w) out of the C pieces of conversion pixel data. For the rest of (T−w), the luminous value of the pixel data of the next coordinates (P+1,Q-4) is applied in outputting these pieces (the luminous value has been sent from the character·line detect circuit 103) (S27→S28).

On the other hand, the counter shows w or less, and that the pixel data for (P,Q-4) currently inputted is not Wth pixel data (i.e. when the pixel data is in the middle of W consecutive pieces of pixel data), nearest neighborhood interpolation is performed (S27→S29→S22).

If the counter T shows w or less value, and the pixel data of (P,Q-4) currently inputted is the Wth pixel data (i.e. last pixel data in the W consecutive pieces of pixel data), then nearest neighborhood interpolation is performed and the same luminance is adopted in outputting (w−T) pixel data pieces. Note that in this case, nearest neighborhood interpolation is performed using the next coordinates to the (w−T) pieces of pixel data (S27→S29→S30).

By performing the above described Steps S27–S30, the line-width prioritize interpolation circuit 102 enables to consecutively output [consecutive number of line pixels W×conversion rate X] line-forming pixels without depending on the consecutive number of inputted line-forming pixels: whether it is one inputted line-forming pixel or more than two.

(Operation Performed by Selection Circuit 104)

The selection circuit 104 concurrently receives converted pixel data from the barycenter maintain interpolation circuit 101 and that from the line-width prioritize interpolation circuit 102. At the same time, the selection circuit 104 receives a judgment result (as to whether a target pixel is a character part or not) from the character·line detect circuit 103. The selection circuit 104 will then select either the converted pixel data sent from the barycenter maintain interpolation circuit 101 or that from the line-width prioritize interpolation circuit 102 based on the judgment result sent from the character·line detect circuit 103, and outputs the selected pixel data after conversion.

Figure 6:
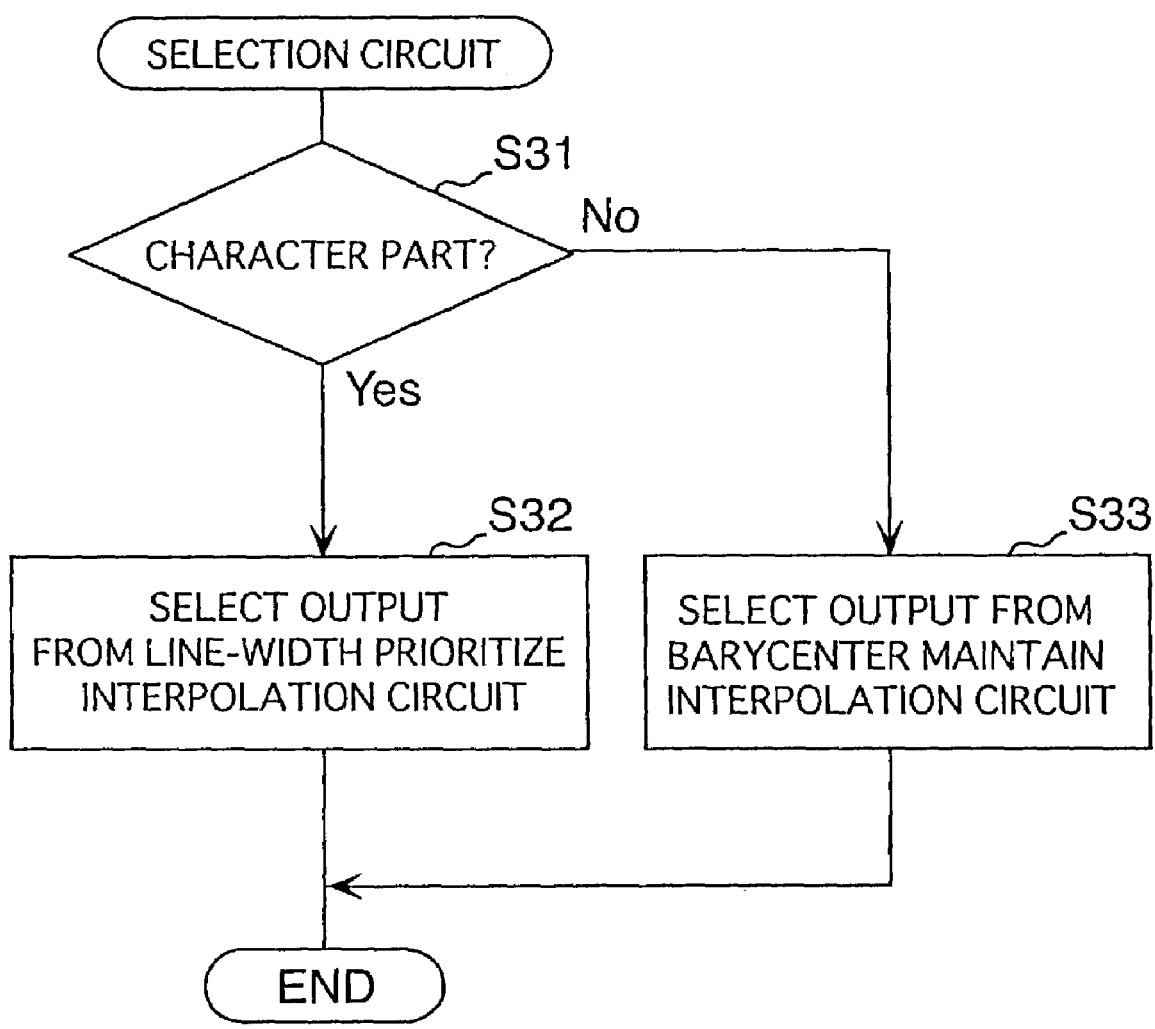
FIG. 6 is a flow chart showing an operation performed by a selection circuit according to the first embodiment.

That is, the selection circuit 104 performs the operation shown in FIG. 6 every time pixel data is inputted.

When the judgment result sent from the character·line detect circuit 103 shows that the target pixel is not a character part, pixel data outputted from the line-width prioritize interpolation circuit 102 is selected (Step S31→S32), and when the judgment result shows that it is a character part, pixel data outputted from the barycenter maintain interpolation circuit 101 is selected (Step S31→S33).

(A Case when Necessary to Perform Pixel Number Conversion in Vertical Direction)

In the above, only a case in which a pixel number conversion is performed in the horizontal direction is described. Both conversions in horizontal and vertical directions are made possible by converting at a pixel number conversion rate XV for the vertical direction, after converting at a pixel number conversion rate XH in the horizontal direction.

For example, conversion for the horizontal direction at a horizontal direction conversion rate of XH as described in the above is performed first. Then, order of the output image signals is changed from line to row. Next, using the same apparatus, conversion is performed at a vertical direction conversion rate XV.

Finally, for the same output image signals, the order of pixel data is changed from line to row. The stated series of operation enables pixel number conversion at a rate of horizontal direction conversion rate XH and at a vertical direction conversion rate XV.

Or, another method is also possible in which the detect result outputted by the character-line detect circuit 103 is used to perform a vertical direction conversion as well as the horizontal direction conversion. This method also enables both of the horizontal and vertical conversions.

In this method, the character-line detect circuit 103 counts consecutive number of line pixels W for the vertical direction as well, converts the number of outputted character information so that the number will be a multiple of (pixel number conversion rate XH×pixel number conversion rate XV), and performs conversion for the vertical direction as well, in the same manner as described in the flow chart in FIG. 4. In addition, line-width prioritize interpolation circuit 102 performs the same operation as shown in FIG. 5 for the vertical direction. Note that a modification is necessary to have a vertical counter Tv for a number of pixels existing on one line, to make each counter Tv to count every another line.

(Effect of the First Embodiment)

First, comparison is performed between barycenter maintain interpolation, line-width prioritize interpolation, and neighboring interpolation.

FIGS. 7A–7C are cases in which pixel number conversion is performed at a horizontal direction conversion rate XH=2.25 and a horizontal direction conversion rate XV=1. FIG. 7 shows how an input image (8 pixels×4 pixels) is converted to an output image (4 pixels×18 pixels). Input images shown in FIGS. 7A, 7B, and 7C have a line-forming pixel at the coordinate H3 (third pixel from the left) and H6 (sixth pixel from the left), which has a character as a letter image.

FIG. 7A is a case in which this input image is converted by the barycenter maintain interpolation. In this case, each output pixel in the output image has been interpolated using 4 pixels in the input image as a reference. Although the barycenter of luminance is maintained after conversion, an edge part of line after conversion has been blurred.

FIG. 7B is a case in which the line-width prioritize interpolation circuit 102 is used in conversion. In this case, the line segment H3 in the input coordinates (i.e. line-width of 1 pixel) is converted into a line of D6 and D7 in the output coordinates (line-width of 2 pixels). Likewise, the line segment H6 in the input coordinates (i.e. line-width of 1 pixel) is converted into a line of D12 and D13 in the output coordinates (line-width of 2 pixels).

FIG. 7C is a case in which nearest neighborhood interpolation is used in conversion. In this case, H3 line segment in the input coordinates (line-width of 1 pixel) is converted into a line of D6 and D7 in the output coordinates (line-width of 2 pixels). On the contrary, H6 line segment in the input coordinates (line-width of 1 pixel) is converted into D12, D13, and D14 in the output coordinates (line-width of 3 pixels).

As such, use of line-width prioritize interpolation circuit 102 for interpolating a character part as a letter image enables to yield a line that has an edge part with no blurriness. Further, in the input image, a same line-width in the horizontal direction is converted into a line of the same width after pixel number conversion, with the position of the edge part after conversion being in the vicinity of the corresponding edge part in the output image.

Note that in conversion in the vertical direction, a same line-width will be yielded after pixel number conversion as well as in the horizontal conversion. Therefore, a same line-width either in horizontal, vertical, or slanting direction, is converted into a same line by pixel number conversion.

In addition, a curved line can be considered to be a continuity of small segments. It can be derived that a curved line will have an identical line-width after pixel number conversion.

Note that conversion using the line-width prioritize interpolation sometimes yields a line which is located in a different position than the one in the input image depending on a conversion rate that has been used. In this sense, the line will more or less look strange to users. However, a line having different line-width will look stranger than a line whose position in the output image is far from its original position in the input image.

In particular, an image including ruled lines will look strange if the line-widths are not uniform among lines. The effect of maintaining the line-width as it is after the image conversion due to the present embodiment is great in a practical point of view.

In addition, in this embodiment, switching is enabled between the line-width prioritize interpolation circuit 102 and the barycenter maintain interpolation circuit 101 depending on whether a target pixel is a character part as a letter image or not. This enables to yield lines with no blurriness and to yield a line in an input image will be converted into a same line-width by a pixel number conversion. On the other hand, for natural images, a barycenter maintain interpolation is selected, which yields an output image that appears agreeable to users as a natural image.

Second Embodiment

FIG. 8 is a block diagram showing an image processing apparatus according to the second embodiment of the present invention. In the image processing apparatus 200 of the second embodiment, a personal computer 10 performs pixel number conversion at a pixel number conversion rate X (horizontal direction conversion rate XH and vertical direction conversion rate XV) on the output image signal for outputting to a display apparatus 20, just as the image processing apparatus 100 of the first embodiment. The second embodiment is different in that when the pixel number conversion rate X is near an integer, line-width prioritize interpolation is used for conversion, and when the pixel number conversion rate X is not near an integer, barycenter maintain interpolation is used for conversion.

In the second embodiment, a pixel number conversion in a horizontal direction is described first for facilitating understanding.

This image processing apparatus 200 comprises a barycenter maintain interpolation circuit 201, a line-width prioritize interpolation circuit 202, a line detect circuit 203, a selection circuit 204, and a coordinates judgment unit 220, and so on.

Of these, the barycenter maintain interpolation circuit 201, the line-width prioritize interpolation circuit 202, and the coordinates judgment unit 220 are the same as the barycenter maintain interpolation circuit 101, line-width prioritize interpolation circuit 102, and the coordinates judgment unit 120 in the first embodiment respectively.

The line detect circuit 203 is the same as the character·line detect circuit 103 in the first embodiment. However, the selection circuit 204 performs selection based on a pixel number conversion rate X. Accordingly, the line detect circuit 203 does not send character information showing whether a target pixel is a character part or not to the selection circuit 204. Instead, the reception unit sends a signal for the pixel number conversion rate X to the selection circuit 204.

(Operation Performed by the Selection Circuit 204)

FIG. 9 is a flow chart showing an operation of the selection circuit 204. Every time pixel data is inputted, the operation shown in FIG. 9 is performed.

The selection circuit 204 selects one type of converted pixel data from among the one outputted from the barycenter maintain interpolation circuit 201 and that outputted from the line-width prioritize interpolation circuit 202, both kinds of converted pixel data having being sent concurrently, then the selection circuit 204 outputs the selected type of pixel data.

As shown in FIG. 9, the selection circuit 204 selects pixel data outputted from the line-width interpolation circuit 202 when a value of a pixel number conversion rate X sent from the reception unit is near an integer (Step S41→S43). When the value is not near an integer, the selection circuit 204 selects output pixel data from the barycenter maintain interpolation circuit 201 (Step S41→S43).

One example of methods for judging whether a pixel number conversion rate X is near an integer or not is to judge that X is near an integer when the difference between a conversion rate X and [X] is pixel value Δ or less (i.e. $|X-[X]| \leq \Delta$). (Note that this predetermined value Δ is smaller than 0.5, such as 0.3, 0.2, or 0.1.) And when the difference between a pixel number conversion rate X and [X] is greater than the predetermined value Δ($|X-[X]| > \Delta$), the X is judged not to be near an integer.

Note that in the above description, only a pixel number conversion in the horizontal direction is described. However, both of the horizontal and vertical direction conversions are made possible by combining a horizontal conversion and a vertical conversion as performed in the first embodiment.

(Effect of the Second Embodiment)

According to the second embodiment, when a pixel number conversion rate X is near an integer, a pixel number conversion is selected which yields a same line-width, after conversion, between lines that have a same line-width in an input image with each other.

In this case, for letter images, line parts will not be blurred, and that a line in the input image will be converted into a line with the same width as before. In addition, for natural images, the line-width prioritize interpolation is selected. However, in such a case, if a pixel number conversion rate X is near an integer, it is known that application of line-width prioritize interpolation to natural images will not yield images that do not look so strange.

On the other hand, when a pixel number conversion rate X is not near an integer, barycenter maintain interpolation is adopted such as cubic interpolation or line interpolation and so on.

In such a case, a conversion method that is suitable for natural images is adopted. At the same time, barycenter maintain interpolation is used to convert letter images.

The line-width prioritize interpolation tends to yield lines that look strange due to the disposition of lines when a pixel number conversion rate X is not near an integer. However, use of barycenter maintain interpolation for a case in which a pixel number conversion rate X is not near an integer as described in the present embodiment, disposition of lines will not occur. Therefore, the resulting line might be still blurred but will not look very strange to users.

(Modification of the Embodiments)

It is possible to combine the first and second embodiments.

For example, as described in the first embodiment, detection is performed on the pixel data to see whether it is a character part. Then, if the resulting pixel number conversion rate X is near an integer, output from the line-width prioritize interpolation circuit 202 is unconditionally selected. When the pixel number conversion rate X is not near an integer, first judgment is made as to whether the pixel data is a character part or not just as the first embodiment. If it is a character part, the selection circuit 204 will select the output from the line-width prioritize interpolation circuit 202. And when the pixel number conversion rate X is not near an integer, it is possible to select output from the barycenter interpolation circuit 201.

Third Embodiment

FIG. 10 is a block diagram showing an image processing apparatus according to the third embodiment of the present invention. An image processing apparatus 300 of the present embodiment is the same as the image processing apparatus 100 in that an image signal outputted from the personal computer 10 is converted by the pixel number conversion at a pixel number conversion rate X (a horizontal direction conversion rate of XH, and a vertical direction conversion rate of XV), and that the result is outputted to the display apparatus 20. The difference in this embodiment is that the pixel number conversion is performed for the pixel data corresponding to an edge part using an integral multiple conversion rate that is nearest to the pixel number conversion rate X, and for pixel data that is not at the edge part, line-width prioritize interpolation is performed so that converted pixel data will not have so much difference between the pixel number conversion rate X, while as an output image as a whole, adjustment is performed using a pixel number conversion rate X.

This image processing apparatus 300 comprises an edge part detect circuit 303, a line-width prioritize interpolation circuit 310, and a coordinates judgment unit 320. Among these, the coordinates judgment unit 320 is the same as the coordinates judgment unit 120 in the first embodiment.

The edge part detect circuit 303 judges whether a target pixel corresponds to an edge-forming pixel based on the luminous difference between the target pixel and the neighboring pixels, and sends the judgment result to the line-width prioritize interpolation circuit 310 as edge information.

The line-width prioritize interpolation circuit 310 performs interpolation basically according to the nearest neighborhood interpolation. However if the inputted pixel data is judged to be that of an edge part based on the edge information sent from the edge part detect circuit 303, performs adjustment so that the number of the output edge-forming pixel equals the integer [pixel number conversion rate X]. Further, the line-width prioritize interpolation circuit 310 adjusts the number of output pixels on the non-edge-forming pixels so that the output image signal as a whole is the pixel number conversion rate X.

As shown in FIG. 10, the line-width prioritize interpolation circuit 310 includes an integral multiplying unit 311, an arbitrary number multiplying unit 312, and a selection unit 313. The construction enables to use the integral multiplying unit 311, if the pixel data is that of the edge part, so that the output pixel will have the same luminous value as the input pixel and that the number of the output pixels will be arranged to correspond to [pixel number conversion rate X]×number of input pixel. The construction further enables the selection unit 313 to select the arbitrary number multiplying unit 312 that adjusts a number of output pixels, if the pixel data corresponds to that of a non-edge part. However, the same function is also realized by operations of the edge-part detect circuit 303 and of the line-width prioritize interpolation circuit 310, as shown in the following example.

(Operation of Edge-Part Detect Circuit 303)

The edge-part detect circuit 303 includes a pixel data line memory for temporarily storing pixel data for several lines in order to enable detection at the edge-part detect circuit 303 (The pixel data line memory is not shown in the figures). This pixel data line memory enables to send every image signal two lines later after it is inputted.

The edge-part detect circuit 303 judges whether the target pixel is an edge part, and counts the number Z that represents the number of edge-forming pixels in the horizontal direction.

First, operation to judge edge part performed by the edge-part detect circuit 303 is described.

The edge-part detect circuit 303 first makes, to be a target pixel, the pixel (P,Q−1) that has been inputted one line before pixel coordinates (P,Q) currently being inputted, then judges whether this target pixel is an edge-forming pixel or not by comparing pixel data that has been inputted before and after this target pixel. The specific methods are described in the following.

An example method is that when the luminous difference between the target pixel and before and after the target pixel is a predetermined value or more (e.g. 64 or more or 32 or more), the target pixel is judged to be an edge part, and when the difference in luminance is less than the predetermined value, the target pixel is judged to be a non-edge part.

There is also another method by which an edge part is detected by judging whether the spacious frequency in the vicinity of the target pixel is a predetermined value or more. In another method, a target pixel is judged to be an edge part only when both of the conditions of the luminous difference and the spacious frequency are met.

By the judgment described in the above, pixels that constitute edge parts in the horizontal direction are detected that are included in diagrams, letters, and ruled lines.

Note that the edge-part detect circuit 303 comprises a detect result line memory for temporarily storing the result of the above judgment (i.e. edge information showing whether each piece of pixel data is an edge-forming pixel or not). This detect result line memory enables to store thereon edge information of pixel data from the one that is currently inputted to the one that has been inputted two lines before.

Next, an operation for calculating consecutive number of edges is explained which is performed by the edge-part detect circuit 303.

FIG. 11 is a flow chart showing calculation of consecutive number of edges performed by the edge-part detect circuit 303. The edge-part detect circuit 303 performs the operation shown in this flow chart every time pixel data is inputted.

This operation is almost the same as the line-width calculation operation performed by the character·line detect circuit which has been described in the first embodiment. Therefore, the description here is simplified.

First, the pixel data for the coordinates (P,Q−2) that is being currently inputted is judged to see whether it is a final edge pixel (i.e. an ending point of the edge-forming pixels) (S51).

When the edge information for the set of coordinates (P,Q−2) indicates that it is 'an edge-forming pixel' and that the line information for the next set of coordinates (P+1,Q−2) indicates that it is a non-edge-forming pixel, the coordinates (P,Q−2) is judged to be the end of the edge-forming pixel.

If the (P,Q−2) is judged to be the end of the edge-forming pixels, a consecutive number of the edge pixels in the horizontal direction up to (P,Q−2) is counted (i.e. consecutive number of edge pixels Z) (S51→S52).

The detection at Step S51 that is mentioned in the above is performed by applying a pattern matching method to the edge information on the pixel coordinates (P,Q−2) and on the coordinates before and after the (P,Q−2), for example.

Then, the obtained consecutive number of edge pixels Z is sent to the line-width prioritize interpolation circuit 310 (S53).

Further, the character·line detect circuit 103 sends, to the line-width prioritize interpolation circuit 310, the pixel data on the next coordinates (P+1,Q−2) to the (P,Q−2) by referring to the pixel data line memory.

(Operation Performed by the Line-Width Prioritize Interpolation Circuit 310)

The line-width prioritize interpolation circuit 310 comprises a counter T for counting how many pieces of pixel data are outputted from the beginning of the edge-forming pixels.

FIG. 12 is a flow chart showing an example of the operation performed by the line-width prioritize interpolation circuit 310. The line-width prioritize interpolation circuit 310 performs the operation shown in FIG. 12 every time pixel data is inputted. The following describes the operation in detail.

When the edge information inputted from the edge-part detect circuit 303 shows that it is non-edge-forming pixel, basically the nearest neighborhood interpolation is performed (Step S61→S62).

On the other hand, when the edge information received from the edge-part detect circuit 303 shows that the pixel is "edge-forming pixel," converted pixel data will be outputted by a number of M. Here, M is an integer obtained from the conversion rate X, which is specifically obtained from the expression "M=[conversion rate X] (when 0<X<0.5 applies, M=1)." (S61–S63)

Then, the output pixel number C (i.e. a number of p satisfying the expression 1 in the first embodiment) is added to the pixel data which positions nearest to the pixel data (P,Q−2) that is being currently inputted (S65).

On the other hand, when the edge information received from the character·line detect circuit shows that the pixel is "edge-forming pixel," converted pixel data will be outputted by a number of M. M is an integer obtained from the conversion rate X. Specifically, M=[conversion rate X] (note that M=1 when 0<X<0.5 applies) (S61–S63).

Next, when no signal has been received that represents "consecutive number of edge pixels Z" (i.e. When "No" at the Step S65), it shows that there is an edge pixel to follow. Therefore, the operation will be ended here.

But when the signal representing "consecutive number of edge pixels Z" has been inputted, it shows the ending of the edge-forming pixels. Then the adjustment is performed as described in the following steps S66~S68.

When the value indicated in the counter T is (M×Z) or more, (T−MZ) number of pieces of pixel data are outputted with luminance that the next coordinates (P+1,Q−2) has (S66→S67).

On the other hand, the value indicated in the counter T is less than (M×Z), the nearest neighborhood interpolation of Step S62 is performed on the next pixel data of (P+1,Q−2), by skipping the first (MZ−T) number of output coordinates and by using the next output coordinates (S66→S68).

The line-width prioritize interpolation circuit 310 performs the above operation so as to output edge-forming pixels by a number according to [conversion rate X]. As for the number of outputted non-edge-forming pixels, the adjustment is made so that the whole output image is converted in accordance with the conversion rate of X.

Note that when a line-forming pixel and a peripheral pixel are arranged in series at a fine pitch such as one or two pixels, consecutive number of edge pixels Z sometimes becomes large.

In case when the consecutive number of edge pixels Z is large and that the value of a conversion rate X is far from an integer, the above operation sometimes makes an edge position in the input image and that in the output image different from each other, which looks strange to viewers.

In order to avoid the stated inconvenience, the edge-part detect circuit 303 arranges so that the maximum value for the consecutive number of edge pixels Z is 4. When 5 or more edge-forming pixels constitute an edge, it is possible to exceptionally arrange the fifth edge-forming pixel to be treated as non-edge-forming pixel.

(Conversion in the Vertical Direction)

The above description is focused on the pixel number conversion only in the horizontal direction. As explained in the first embodiment, it is also possible to perform vertical conversion as well as horizontal conversion. In such a case, however, arrangements are necessary such as changing the design to enable the edge-part detect circuit 303 to count a consecutive number of edge pixels Z in the vertical direction.

The following describes a specific example of the input image used in the pixel number conversion of the present embodiment.

FIG. 13 depicts a case in which a horizontal direction conversion rate XH=2.25 and a vertical direction conversion rate XV=1 are used for performing a pixel number conversion. It depicts how the input image signals corresponding to the input coordinates (from H1 to H8) are converted in the horizontal direction to the output coordinates (from D1 to D18).

In FIG. 13, each set of white input coordinates (H1, H2, H6, H7, H8) has pixel data of a luminous value of around 255, whereas each set of black input coordinates (H3, H4, H5) has pixel data of a luminous value of around 0.

In such a case, the four sets of input coordinates, H2, H3, H5, and H6 will be detected to be pixel data for edge-forming pixels.

When the conversion rate is X=2.25, then M=[2.25]=2. Therefore, as FIG. 13 shows, the input pixel data for the input coordinates (H2, H3, H5, H6) will be outputted in an output position that is relatively near the input position with 2 times as much as the pixel number as the input pixel data (operated by the integral multiplying unit 311).

For the pixel data for H1, H4, H7, and H8, nearest neighborhood interpolation is normally applied in conversion before being outputted. In this operation, adjustment is made so that the whole output pixel number will be 18, which results in a conversion rate of 2.25 for the entire image.

(Effect of the Third Embodiment)

According to the pixel number conversion according to the present embodiment stated in the above, the edge part in the input image will be converted into an output edge part that does not have blurriness. Also depending on an input image or a conversion rate X, the position of the edge part after conversion has a chance of being located at a different position from the input position. However, the difference is not expected to be so large.

In addition, for an image having a line-width of one or two pixels, a certain multiplying rate M that is determined by the conversion rate X is used for conversion.

This means that if a consecutive number of line-forming pixels is 1 in the input image (i.e. the image part has a line-width of one pixel), the consecutive number of edge pixels Z is usually 3. In such a case, M number of line-forming pixels will be outputted consecutively after conversion. And when the consecutive number of line-forming pixels is 2, the consecutive number of edge pixels Z becomes 4. In this case, the line-forming pixels will be outputted by a number of 2M after conversion.

Therefore, images including fine letters and fine diagrams frequently used in personal computers, the width among the fine lines will be uniform, and the resulting converted image will look less strange to viewers.

Note that in the pixel number conversion method of the present embodiment, if a consecutive number of line-forming pixels is 3 or more, the consecutive number of edge pixels Z at the beginning part of the line-forming pixels will normally be 2. In such a case, the line-width will not be assured to be uniform. However, with lines with a wide line-width, the lines tend not to look strange to viewers even when the line-widths are not uniform. Therefore, the pixel number conversion method of the present embodiment is useful enough since the line-width will be uniform with fine lines of such as one or two pixels.

Further, the present embodiment enables to keep fine line-width in the vertical direction as well as that in the horizontal direction. This means that a same line-width in the input image will be maintained after conversion in either direction: horizontal; vertical; or slanting directions. Moreover, a curve with a same width in the input image will maintain its width after pixel number conversion.

(Modification of the Third Embodiment)

So far, the description basically uses a method by which the luminous value of a piece of input pixel data is applied to a piece of pixel data after conversion. However, as FIG. 14 shows, interpolation that basically uses integral multiplying interpolation as described in the above is used for the edge parts, and uses line interpolation for parts that are far from the edges.

That is, in FIG. 14, among the output coordinates, D4–D7, and D11–D14 that are in the vicinity of the edge parts, integral multiplying interpolation (as shown by the solid arrows in FIG. 14) is performed. The luminous value is allocated as it was accordingly. However, for D1–D3, D8–D10, and D15–D18, line interpolation of 2 taps is used (as shown by the dotted lines in FIG. 14).

Such a pixel number conversion is performed as described in the following for example.

In the above image processing apparatus 300, a line-width prioritize interpolation circuit 310 is installed together with a line interpolation circuit located in parallel. Also installed in the image processing apparatus 300 is a selection circuit for selecting between output from the line-width prioritize interpolation circuit 310 and output from the line interpolation circuit. Edge information is sent from the edge part detect circuit 303 to the selection circuit. If the edge information shows that it is an edge part, output from the line-width prioritize interpolation circuit 310 is selected, and if the edge information shows that it is not an edge part, output from the line interpolation circuit is selected.

Note that two-tap line interpolation is used in creation in the FIG. 14. However, if there is no hardware limitation, the number of taps may be arbitrary. Moreover, cubic interpolation is also possible.

As such, combined use of the line interpolation and cubic interpolation enables to improve image quality after conversion in addition to the above mentioned effect of keeping consistency between line-widths without blurriness. That is, the method improves smoothness in the non-edge parts, which will help the image look more natural. This effect is usually expected to be greater for the cubic interpolation than the line interpolation, and more number of taps than less.

Fourth Embodiment

FIG. 15 is a block diagram showing an image processing apparatus according to the fourth embodiment of the present invention.

This image processing apparatus 400 comprises a barycenter maintain interpolation circuit 401, a character part detect circuit 404, a B selection circuit 406, a line-width prioritize interpolation circuit 410, a coordinates conversion unit 420, and so on.

Among these components, the barycenter maintain interpolation circuit 401 and the coordinates conversion unit 420 are the same as the barycenter maintain interpolation circuit 101, the line-width prioritize interpolation circuit 102, and the coordinates judgment unit 120, all being described in the first embodiment.

The character part detect circuit 404, too, is the same as the character-line detect circuit 103 described in the first embodiment in that every time an image signal is inputted, the judgment is performed as to whether a target pixel is a character part based on a certain range of pixel data surrounding the target pixel, and as to whether the target pixel is a line-forming pixel or a peripheral pixel (non-line-forming pixel), and sends the judgment result to the line-width prioritize interpolation circuit 410 and to the B selection circuit 406.

The line-width prioritize interpolation circuit 410 comprises a nearest neighborhood interpolation circuit 411, a pattern matching interpolation circuit 412, and an A selection circuit 413, and performs interpolation according to a pixel number conversion rate signal X and using the nearest neighborhood interpolation circuit 411 and the pattern matching interpolation circuit 412.

The nearest neighborhood interpolation circuit 411 performs interpolation using the luminous value of the inputted pixel, as it is, that is situated in the nearest position to the pixel after conversion. The pattern matching interpolation circuit 412 performs interpolation by pattern matching based on the information on whether a fixed area around each input image pixel is a line-forming pixel. The pattern matching interpolation circuit 412 includes an interpolation table that is set for each pixel number conversion rate X, which is used in performing interpolation. The details of this operation will be explained later. An A selection circuit 413 is equipped with a line memory for temporarily storing either image signals after subjected to the pixel number conversion through the nearest neighborhood interpolation circuit 411, or pixel data after subjected to the pixel number conversion by the pattern matching interpolation circuit 412. Then, the A selection circuit 413 sequentially outputs the image signals having been temporarily stored.

Each pixel of the image signal after conversion that is outputted from the barycenter maintain interpolation circuit 401 or from the A selection circuit 413 will be sent to the B selection circuit 406. Note that the output timing of the image signal after the pixel number conversion is arranged so that the speed of outputting is (horizontal direction conversion rate XH)×(vertical direction conversion rate XV) times as much as the speed of the inputting speed of the image signal.

The B selection circuit 406 selects one from the pixel data outputted from the barycenter maintain interpolation circuit 401 and the pixel data outputted from the line width prioritize interpolation circuit 410, based on the judgment result sent from the character part detect circuit 404 (i.e. judgment result on whether it is a character part or not).

(Interpolation Table of the Pattern Matching Interpolation Circuit 412)

FIG. 16 shows an example of the interpolation table used by the line-width prioritize interpolation circuit 410. The interpolation table shown in FIG. 16 is used when the pixel number conversion rate X is (horizontal direction conversion rate XH=1.2 times as much, vertical direction conversion rate XV=1.4 times as much).

The pattern matching circuit 412 is the same as the nearest neighborhood interpolation circuit in that it converts pixel data according to the pixel data before conversion that situates nearest to the target pixel data. However, the difference of the pattern matching circuit 412 is that it applies the luminous value only to the pixel coordinates selected according to the pattern matching, not to all the converted pixel coordinates positioned in the neighborhood. The stated interpolation method enables pixel number conversion that yields uniform line-width after conversion, and without discontinuity in the converted lines.

The pixel number ratio of an input image and its output image is defined by a pixel number conversion rate X. When a pixel number conversion rate X is (horizontal direction conversion rate XH=1.2, and vertical direction conversion rate XV=1.4), image data of 5 pixels×5 pixels (i.e. 25 pixel data) will be converted to image data of 6 pixels×7 pixels (i.e. 42 pixel data).

FIG. 17 is drawn to explain the above mentioned interpolation table which shows an input image coordinates frame corresponding to the interpolation table shown in FIG. 16, and an output image coordinates which is resultant from converting the mentioned input image coordinates frame.

In FIG. 17, when each set of pixel coordinates for the input image coordinates frame (25 pixels) is in one to one relation to the nearest pixel coordinates in the output image coordinates frame (42 pixels), there will be (42−25)=17 pixel number of "remaining pixel coordinates." (In FIG. 17, the remaining pixel coordinates are shown as shaded coordinates with oblique lines.

The output pixel coordinates (r,s) corresponding to the input pixel coordinates (R,S) will be obtained by the expressions: r=[R×XH]; s=[S×XV]

For example, the output pixel coordinates corresponding to the input pixel coordinates (3,3) will be (4,4) since the horizontal coordinate is calculated as [3×1.2]=4, and the vertical coordinates is also 4 from the expression [3×1.4]=4.

Then, for each set of the remaining pixel coordinates, the following 13 sets of input pixel coordinates are selected to be used in interpolation as a reference: (1,1), (2,1), (4,1), (5,1), (6,1), (2,3), (1,4), (2,4), (4,4), (5,4), (6,4), (2,6), (2,7). In the input pixel frame in FIG. 17, the 13 sets of pixel coordinates are shown as shaded coordinates with lateral lines.

Also in the interpolation table in FIG. 16, it is obligatory to use the pattern matching method for the base pixel data for use as a reference in interpolation.

That is, in the interpolation table in FIG. 16, if written "vertical", "horizontal", or "two-way direction" on the coordinates frame corresponding to the table reference coordinates (R,S), the pattern matching interpolation circuit 412 will perform multiplying into "vertical" "horizontal" or "two-way" direction, so as to obtain output pixel coordinates through interpolation. And in the stated interpolation table, if the coordinates frame corresponding to the table reference coordinates (R,S) is blank, the output from the nearest neighborhood interpolation circuit 411 is meant to be selected.

Note that the output pixel coordinates that correspond to the base pixel coordinates by one-to-one relation (shown with vertical lines) are situated on the left or above the remaining pixel coordinates.

In addition, as shown by the output image coordinates frame, all the coordinates on the second line and the fifth line correspond to remaining pixel coordinates, which will be interpolated based on the base input pixel data, in the input pixel coordinates frame, that correspond to the first and third lines.

As seen in the above, the interpolation table is set not only to interpolating output pixel coordinates that have one-to-one relation to the base input pixel, but also to enable interpolation for the remaining coordinates that situate near the stated output pixel coordinates.

Here, in the present embodiment, the interpolation table with the horizontal direction conversion rate XH=1.2, and the vertical direction conversion rate XV=1.4 is explained. However, an arbitrary conversion rate can be set for an interpolation table.

(Operation of Character Part Detect Circuit 404)

The character part detect circuit 404 makes input pixel (P,Q−3) that has been inputted three lines before the input of the coordinates (P,Q) to be a target pixel, and judges whether this target pixel positions inside the character part, or a line-forming pixel or a line peripheral pixel, based on the data for the surrounding pixels around the target pixel.

The operations performed by the character part detect circuit 404 for character part judgment and line judgment are the same as the character part detect circuit 103 that has been described with reference to the flow chart in FIG. 2 in the first embodiment. Therefore description is omitted here for the operation of the character part detect circuit 404.

Note that just as in the first embodiment, the pixel data line memory is installed in the character part detect circuit 404 for temporarily storing pixel data for several lines. Accordingly, there occurs a delay for an image signal to reach the barycenter maintain interpolation circuit 401 and to reach the line-width prioritize interpolation circuit 410 for five lines after the image signal is inputted to the character part detect circuit 404.

The detect results yielded by the character part detect circuit 404 will be sent to the pattern matching interpolation circuit 403 and to the B selection circuit 406.

Specifically, the pixel data to be treated, at the moment, at the pattern matching interpolation circuit 403 has been inputted 5 lines before the input of the pixel data of (P,Q) that is currently inputted. Therefore, line information for the 3×3 frame of pixel data that surrounds the (P,Q−5) is taken out from the detect result line memory and is sent as the pattern object information for pattern matching to the pattern matching interpolation circuit 403. Also with the line information, the average luminous value MA for the line-forming pixel group and the average luminous value MB for the peripheral pixel group are sent to the pattern matching interpolation circuit 403.

Likewise, the character information of (P,Q−5) is read from the detect result line memory and sent to the B selection circuit 406.

Note that when sending the character information to the B selection circuit 406, the number of pieces of character information is also sent which has been calculated according to the pixel number conversion rate X by multiplying the horizontal direction conversion rate XH×vertical direction conversion rate XV. This means that the number of pieces of judgment result information transmitted to the B selection circuit 406 is (horizontal direction conversion rate XH) times the actual number of the pieces of character information. And for the judgment signal corresponding to the base pixel coordinates on the first and the third lines that are referenced in interpolation is sent to the B selection circuit 406 twice. This operation enables the B selection circuit 406 to sequentially judge the pixel data after pixel number conversion.

(Operation of Line-width Prioritize Interpolation Circuit 410)

Here, description will be based on the assumption that the pixel number conversion rate X is (horizontal direction conversion rate XH=1.2, vertical direction conversion rate XV=1.4), and that the width of the line-forming pixel to be detected at the character part detect circuit 404 is 1 pixel (i.e. either the horizontal direction consecutive number or the vertical direction consecutive number is 1 for the line-forming pixel).

FIGS. 18–20 show a conversion table used by the pattern matching interpolation circuit 412 when the line-width detected at the character part detect circuit 404 is 1 pixel. This conversion table will be detailed later.

The line-width prioritize interpolation circuit 410 performs operation shown in the flow chart of FIG. 21, every time pixel data is inputted.

When the line information sent from the character part detect circuit 404 indicates that "it is not a line-forming pixel" (No at S71), output from the nearest neighborhood interpolation circuit 411 is selected (S72).

On the other hand, if the line information from the character part detect circuit 404 indicates that "it is a line-forming pixel", an interpolating method to be used is decided based on the coordinates of the target pixel (P,Q−5), with reference to the interpolation table shown in FIG. 16.

In pursuing the above operation, first, the table reference coordinates (R,S) corresponding to the target pixel are calculated for use with reference to the interpolation table of FIG. 16 (S73).

In FIG. 16, the interpolation table shows that the horizontal pixel number is 5, and that the vertical pixel number is also 5. In this case, the table reference coordinates (R,S) are calculated by expressions:

$R=(P-1)\bmod 5+1$; and $S=(Q-6)\bmod 5+1$.

Then, according to the table reference coordinates (R,S) obtained at Step S71, the interpolation table of FIG. 16 is referenced so as to decide an interpolation method (S74).

That is, the instruction will be given so as to generate pixel data of output pixel coordinates described in the coordinates frame, by multiplying in the direction which is described in the coordinates frame corresponding to the table reference coordinates (R,S), as shown in the interpolation table of FIG. 16. Also in such a case, the A selection circuit will be instructed to select output from the pattern matching interpolation circuit 412 in this case.

On the other hand, when the coordinates corresponding to the table reference coordinates (R,S) is blank in the interpolation table of FIG. 16, the A selection circuit will be instructed to select output from the nearest neighborhood interpolation circuit 411.

Then, according to the selected interpolation method, the interpolation is performed in the following manner (S75).

(Operation Performed by the Pattern Matching Interpolation Circuit 412)

FIGS. 18–20 show pattern matching conversion tables that are used in common when the line-width in the input image is 1 pixel. In these conversion tables, 3×3 pixel frames situated on the left side of each arrow are the patterns to be consulted in the judgment of matching. On the right side of the arrows, the frames showing patterns for the corresponding output pixel data are situated, with output pixel coordinates surrounded by the bold lines.

Also in FIGS. 18–20, a black pixel frame indicates that it is a line-forming pixel, and a white pixel frame indicates that it is a peripheral pixel around a line. In addition, a plurality of pixel frames that are shaded by oblique lines indicate that at least one pixel frame is a line-forming pixel, and that parts of pixel frames that are shaded with lateral lines indicate that they can either be line-forming pixels or other kinds of pixels.

The pattern matching interpolation circuit 412 refers to the pattern matching conversion table of FIGS. 18–20, according to the interpolation method that is chosen at Step S74. Then, an input pattern is selected, from the input pattern, which matches the line information (i.e. line information in a 3×3 pixel frame), then output pixel data is generated according to the output pattern that corresponds to the selected input pattern. Note that the average luminous value MA corresponding to the line-forming pixels is used for the black pixels of the output patterns in FIGS. 18–20, and the average luminous value of MB is used for the white pixels.

A concrete operation is as follows.

(1) Horizontal Magnification

In multiplying in a horizontal direction, multiplying is performed by referring to the pattern matching conversion table of FIG. 18.

First, when only one line-forming pixel exists within the 3×3 pixel frame around the target pixel, it is magnified in the horizontal direction according to ① in the pattern matching conversion table of FIG. 18A.

When more than two line-forming pixels exist within the 3×3 pixel frame which surrounds the target pixel, the following method is used in the pattern matching.

First, when it matches either case shown in ② or ③ in the pattern matching conversion table, the corresponding conversion is used.

On the other hand, when both of the conditions of ② and ③ are met, it is judged whether any of the exceptional examples shown in FIG. 18B applies. And when there is an example that matches, the pattern that matches is used for conversion, and when there is not, both of ② and ③ are used in conversion. In such a case, the output image signal is made to be a sum of ② and ③.

Note that it is assumed that there is no case that is a combination among exceptional examples, or a combination of exceptional example in FIG. 18B and any of the basic examples in FIG. 18A.

(2) Vertical Magnification

Vertical magnification is performed with reference to the pattern matching conversion table of FIG. 19, in exactly the same manner as the (1) when horizontal magnification is performed.

(3) Two-Way Direction Magnification

Magnification into both the horizontal and vertical directions is performed with reference to the pattern matching conversion table of FIG. 20.

When only one line-forming pixel exists within a 3×3 pixel frame with a target pixel in its center, pattern ① in FIG. 20A is used to perform magnification into two-way directions.

When two or more line-forming pixels exist within a 3×3 pixel frame, firstly, judgment is made whether any of ②, ③, ④, and ⑤ matches in FIG. 20A. If any one of the pattern matches, then magnification is performed using the pattern that matches the pixel frame.

On the other hand, when two or more conditions are met in ②, ③, ④, and ⑤, firstly, judgment is made whether any of the exceptional patterns listed in FIG. 20B applies, and when there is an exceptional pattern that applies, magnification is performed according to the pattern. And when there is no exceptional pattern that applies, more than two patterns among ②, ③, ④, and ⑤ in FIG. 20A are selected to be combined and the combination is used for magnification. In such a case, an output image signal will be a sum of the combination of the selected patterns.

A concrete interpolation example according to the stated pattern matching will be discussed in the following in which the image corresponding to that in FIG. 22 (corresponding to FIG. 3B) is inputted and the table reference coordinates (R,S) match those in the input image shown in FIG. 22.

As for the inputted coordinates (2,3), for example, these correspond to two-way direction magnification. Therefore interpolation is performed for the four pixels (2,4), (3,4), (2,5), and (3,5) in the output image in FIG. 22, using the conversion table in FIG. 20.

Pixel data for the inputted coordinates (2,3) is itself a line-forming pixel, and there are line-forming pixels on its right and below. In such a case, none of the exceptional patterns apply shown in FIG. 20B, but a combination of ②, ③, and ④ in FIG. 20A does, which yields a line-forming pixel (i.e. black) for the coordinates, in the output image after conversion, (2,4), (3,4), and (2,5), and yields a peripheral pixel (i.e. white) for the coordinates (3,5).

Next, the inputted coordinates (2,4) correspond to the horizontal direction magnification. Therefore using the conversion table of FIG. 18, interpolation will be performed for the two coordinates (2,6) and (3,6) in the output image in FIG. 22.

The pixel data of the coordinates (2,4) itself indicates that it is a line-forming pixel and there are line-forming pixels on their right, below, and upper-right. In this case, an exceptional pattern ③ of FIG. 18B applies. Therefore, (2,6) is a line-forming pixel (black), and (3,6) is a peripheral pixel (white).

Repetition of pattern matching in the stated manner makes the output image of a uniform line-width (of one pixel) as shown in FIG. 22 will be produced.

The A selection circuit 413 selects either pixel data after conversion from the nearest neighborhood interpolation circuit 411 or that from the pattern matching interpolation circuit 412.

Note that the pixel data on the first line and on the second line in the output image coordinates frame and the pixel data on the fourth line and on the fifth line are to be simultaneously inputted to the A selection circuit 413. Accordingly, a signal corresponding to the second line will be stored in the line memory while a signal corresponding to the first line finishes being outputted (the same method applies to the fourth and fifth lines). This operation enables the A selection circuit 413 to sort out the image signal after conversion for each line, and to send the sorted image signal after conversion to the B selection circuit 406.

Note that it is also possible to install a line memory in the line-width prioritize interpolation circuit 410, so as to make the line-width prioritize interpolation circuit 410 to sort the image signal after conversion for each line, and to send them to the A selection circuit 413.

(Operation of B Selection Circuit)

The B selection circuit 406, when receiving the judgment result (whether the target pixel is a character part or not) from the character part detect circuit 404, selects either one of the pixel data from the barycenter maintain interpolation circuit 401 or the pixel data from the line-width prioritize interpolation circuit 410, based on the judgment result inputted from the character part detect circuit 404 and outputs the selected pixel data.

In this selection operation, pixel data outputted from the barycenter maintain interpolation circuit 401 is selected when the judgment result inputted from the character part detect circuit 404 indicates that it is not a character part (Step S31→S32), and when the judgment result indicates that it is a character part, the pixel data outputted from the A selection circuit 413 is selected (Steps S31→S33).

The above operation enables to select, when the target pixel before conversion is not a character part, pixel data outputted from the barycenter maintain interpolation circuit 401, and pixel data outputted from the line-width prioritize interpolation circuit 410 when the target pixel signal represents that the target pixel is a character part.

For example, when a peripheral image of the target pixel is as described in FIG. 3A, barycenter interpolation circuit 401 will be used for conversion.

And when the peripheral image of the target pixel is as described in FIG. 3B, the line-width prioritize interpolation circuit 410 will be used for pixel number conversion.

(Effect of the Present Embodiment)

By the above described pixel number conversion, an original image with 1 pixel line-width interpolated using only one reference pixel (white coordinates in FIG. 17) will be converted to have 1 pixel line-width, in both horizontal and vertical directions. For an original image with 1 pixel line-width interpolated according to the pattern matching (coordinates with shades in FIG. 17), the line-width will be maintained as 1 pixel after conversion. In addition, the conversion tables in FIG. 18–20 are set to keep 1 pixel line-width after a line with 1 pixel line-width has been converted. Therefore, in a part of the image that result from interpolation using pattern matching (the coordinates which are displayed with shaded lines in FIG. 17), if an original lien has 1 pixel line-width, a corresponding converted line will also maintain 1 pixel line-width.

Accordingly, for letter images, fine lines will not be blurred in neither horizontal nor vertical directions. And the consistency of the line-width will be maintained and the lines will not be cut off after converted.

In particular, the present embodiment uses pattern matching in the line-width prioritize interpolation. This is advantageous for reproducing fine lines especially for oblique lines or where there are many line intersections. This also enables fine letters easy to be read.

On the other hand, a natural image will be converted to look natural as a natural image. Moreover, the boundary between the character part and non-character part will have a relatively smooth transition, which will yield an output image of a good quality if the corresponding input image has both letter and natural images therein.

(Variations of the Present Embodiment)

In the above embodiment, description is based on the horizontal conversion rate of 1.2, and the vertical conversion rate of 1.4. However, each of the horizontal and vertical conversion rates can take any conversion rate if within the range of 1 or more and less than 2 to have a desired result of pixel number conversion in the stated method.

If the pixel number conversion rate of 2 or more, the desired result can still be obtained if the following arrangement is made instead of corresponding the input image coordinates with the output image coordinates in one-to-one relation. That is, if arrangement is made so that a number of output image coordinates, the number being represented by (an integer obtained by dropping the fractional portion of the number of the pixel number conversion rate X) is used for bringing into correspondence with one set of input image coordinates, and if the pixel number of the blocks used in the pattern matching is increased, then the result will be desirable for the pixel number conversion rate of 2 or more.

(Variant Examples for the Embodiments 1 to 4)

In the above embodiments, an operator inputs the pixel number conversion rate. However, it is also possible to automatically calculate a pixel number conversion rate, taking, into account, the format of the input image signal and the pixel number of the display apparatus 20, for example.

In all the embodiments 1–4, the pixel number conversion rate stays the same in one screen. However, it is also possible to implement in the same manner if the screen changes the pixel number conversion rate from area to area.

In the embodiments, 1, 3, and 4, judgment as to whether it is a character part is performed every time pixel data is inputted, and the selection circuit performs the selection based on the judgment result. However, an implementation is also possible to divide one screen into a plurality of areas and to perform judgment for each divided area as to whether the area has a character as a letter image or it is a natural image part, and the selection circuit is made to pursue selection according to the judgment result.

For example, an arrangement can be made so that the character·line detect circuit will temporarily store the image signals for one screen. In the meantime, the judgment is performed as to whether each divided area has a character as line images. In another example in which the administration information administered by the OS of the personal computer 10 can tell which is the natural image area or the letter image area for one screen (e.g. if, for example, the graphic driver performs pixel number conversion, it is possible to tell, from its administration information, whether each area has letter information or not). In such a case, if an arrangement is made to send the administration information to the image processing apparatus, it is made possible to judge for each area as to whether the area is a letter image part or natural image part.

It is possible to combine the conversion method shown in the embodiment 1 and the conversion method in the embodiment 3. For example, it is possible to use the conversion method of embodiment 1 for the horizontal direction, and the conversion method of the embodiment 3 for the vertical direction.

It is also possible to apply line-width prioritize interpolation in the embodiments 3 and 4, if the conversion rate X is a number which is near an integer as shown in the embodiment 2.

The embodiments 1–4 are examples in which sequential interpolation and output are performed every time pixel data is inputted. However, as in the mentioned variant examples, it is also possible to perform interpolation for each area resulting from dividing a screen.

The operations performed by the image processing apparatus (i.e. the operations depicted in the flow chart of FIGS. 2, 4, 5, 6, 9, 11, 12, 21) that are shown in the embodiments 1–4 can also be pursued by software, and therefore can be applicable to computers.

INDUSTRIAL APPLICABILITY

The present invention is applicable to an image processing apparatus that works between the matrix display apparatus such as PDP and LCD and its image signal source. This invention is also applicable to an image processing apparatus installed inside the matrix display apparatus.

The invention claimed is:

1. An image processing method for 1) inputting an original image for displaying in a matrix form, and for 2) performing pixel number conversion, on the original image, at a predetermined pixel number conversion rate in at least one of a column direction and a row direction which has been specified, the image processing method further comprising:
   a first interpolation step of outputting a converted image corresponding to an original image at a predetermined pixel number conversion rate, and
   a second interpolation step of outputting a pixel in the converted image by performing a pattern matching on the pixel in the converted image using a predetermined conversion table; and
   a selecting step of selecting between the output at the first interpolating step and the output at the second interpolating step;
   a character judging step of judging whether each of a plurality of areas making up the original image is a character part or not,
   wherein for an area judged to be a character part in the character judging step, a first pixel number conversion method is selected for performing the pixel number conversion so that lines with a same line-width in the original image is converted into lines with a same line-width, and
   for an area not judged to be a character part in the character judging step, a second pixel number conversion method is selected for performing the pixel number conversion so that a barycenter in the original image is maintained after the pixel number conversion.

2. The image processing method of claim 1, wherein in the character judging step, judgment is performed as to whether each area is a character part or not, based on the information on a line included in the original image.

3. The image processing method of claim 1, wherein in the character judging step, a target pixel in the original image is judged to be a character part when following conditions are satisfied for a predetermined number of peripheral pixels of the target pixel, the conditions being: 1) a line-forming pixel having a width that is no greater than a predetermined width is included, 2) both of a fluctuation coefficient for a luminous value of a line-forming pixel group and a fluctuation coefficient for a luminous value of a peripheral pixel group are a predetermined value or less, and 3) a difference between an average of a gradation value for the line-forming pixel group and an average of a gradation value for the peripheral pixel group is no smaller than a predetermined value.

4. The image processing method of claim 3, wherein the predetermined width of the line-forming pixel is 1 pixel.

5. The image processing method of claim 1, wherein in the character judging step, judgment is performed for each of a plurality of areas making up one screen.

6. The image processing method of claim 1, wherein the first pixel number conversion method is selected when a difference between the pixel number conversion rate and a nearest integer is smaller than a predetermined value, and the second pixel number conversion method is selected when the difference is greater than the predetermined value.

7. The image processing method of claim 1, wherein in the second pixel number conversion method, a pattern matching is performed on line-forming pixels included in the original image using a conversion table created in advance, so as to output corresponding pixels after conversion.

8. An image processing method for 1) inputting, through a signal, an original image for displaying in a matrix form, and for 2) performing pixel number conversion, on the original image, at a predetermined pixel number conversion rate in at least one of a column direction and a row direction which has been specified, the image processing method including:
   a first interpolation step of outputting a converted image corresponding to an original image, at a predetermined pixel number conversion rate;
   a second interpolation step of outputting a pixel in the converted image by performing a pattern matching on the pixel in the converted image using a predetermined conversion table;
   a selecting step of selecting between the output at the first interpolating step and the output at the second interpolating step;

a character judging step of judging whether each of a plurality of areas making up the original image is a character part or not, based on information on a line included in the original image;

wherein in the selecting step, for an area judged to be a character part in the character judging step, a first pixel number conversion method is selected for performing the pixel number conversion so that lines with a same line-width in an original image is converted into lines with a same line-width, and for an area not judged to be a character part in the character judging step, a second pixel number conversion method is selected for performing the pixel number conversion so that a barycenter in the original image is maintained after the pixel number conversion, wherein the first pixel number conversion method is selected when a difference between the pixel number conversion rate and a nearest integer is smaller than a predetermined value, and the second pixel number conversion method is selected when the difference is greater than the predetermined value.

* * * * *

UNITED STATES PATENT AND TRADEMARK OFFICE
CERTIFICATE OF CORRECTION

| | | |
|---|---|---|
| PATENT NO. | : 7,116,842 B2 | Page 1 of 1 |
| APPLICATION NO. | : 10/258153 | |
| DATED | : October 3, 2006 | |
| INVENTOR(S) | : Tomoaki Daigi | |

It is certified that error appears in the above-identified patent and that said Letters Patent is hereby corrected as shown below:

In Claim 1, Column 27, lines 52-61 should be removed. The text starting with "a first interpolation step..." through "...at the second interpolating step;" is not part of this claim.

In Claim 8, Column 28, line 59, the "," (comma) should be removed.

Signed and Sealed this

Thirtieth Day of January, 2007

JON W. DUDAS
*Director of the United States Patent and Trademark Office*